(12) United States Patent
Kanamori et al.

(10) Patent No.: US 6,756,124 B2
(45) Date of Patent: Jun. 29, 2004

(54) COATING COMPOSITION, METHOD FOR PRODUCING THE SAME, CURED PRODUCT AND COATING FILM

(75) Inventors: Tarou Kanamori, Chuo-ku (JP); Miwa Honda, Chuo-ku (JP); Kouji Kawahara, Chuo-ku (JP); Yuichi Hashiguchi, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/833,618

(22) Filed: Apr. 13, 2001

(65) Prior Publication Data

US 2002/0007006 A1 Jan. 17, 2002

(30) Foreign Application Priority Data

Apr. 13, 2000 (JP) ........................................ 2000-112290
Apr. 13, 2000 (JP) ........................................ 2000-112291

(51) Int. Cl.⁷ ............................. B32B 25/20; C08L 83/04
(52) U.S. Cl. ................ 428/447; 106/286.4; 106/287.1; 524/379; 524/430; 524/439; 524/588
(58) Field of Search .......................... 428/447; 252/364, 252/520.2, 518.1; 524/379, 430, 439, 588; 106/286.4, 287.1

(56) References Cited

U.S. PATENT DOCUMENTS

| | | | |
|---|---|---|---|
| 4,904,721 A | | 2/1990 | Hanaoka et al. |
| 5,015,413 A | * | 5/1991 | Nagaoka ...................... 252/511 |
| 5,306,759 A | * | 4/1994 | Sakagami et al. ........... 524/379 |
| 6,165,619 A | * | 12/2000 | Ikenaga et al. ............. 428/448 |
| 6,221,498 B1 | * | 4/2001 | Takahama et al. ...... 106/287.12 |
| 6,231,988 B1 | * | 5/2001 | Kato et al. ................... 428/447 |

FOREIGN PATENT DOCUMENTS

| | | |
|---|---|---|
| EP | 0 274 428 | 7/1988 |
| EP | 0 931 820 A1 | 7/1999 |
| EP | 0 942 052 A1 | 9/1999 |
| EP | 0 989 166 A1 | 3/2000 |
| EP | 1 022 318 A2 | 7/2000 |

OTHER PUBLICATIONS

English Abstract of JP 09–313887, Hiroshi et al., Dec. 1997.*
English Abstract of JP 60–135465, Ikuro, Jul. 1985.*
English Abstract of JP 64–001769, Kinji et al., Jan. 1989.*
Abstract of JP 10–183,062, Jun. 1997, Toshiki.
English Abstract of JP 64–069673 Mar. 1989, Takashi et al.
English Abstract of JP 64–069674 Yasuo et al. Sep. 1987.
English Abstract of JP 04–117,473, Hiroshi et al. Apr. 1992.
English Abstact of JP 09–227,161, Atsushi et al. Sep. 1996.

* cited by examiner

*Primary Examiner*—Jeffrey B. Robertson
(74) *Attorney, Agent, or Firm*—Oblon, Spivak, McClelland, Maier & Neustadt, P.C.

(57) ABSTRACT

A coating composition excellent in dispersion stability of a photocatalyst even in a highly hydrophobic alcohol, excellent in storage stability, giving a coating layer excellent in durability and adhesion, and having a photocatalytic function, which comprises (a) at least one component selected from the group consisting of an organosilane represented by $(R^1)_n Si (OR^2)_{4-n}$ (wherein, $R^1$ represents a monovalent organic group; $R^2$ represents an alkyl group or an acyl group; and n is an integer ranging from 0 to 2), a hydrolyzate and a condensates thereof; (b) an organosiloxane oligomer having an SiO bond and a specific Mw; (c) a photocatalyst; and (d-1) an organic solvent having a surface tension at 20° C. of 260 $\mu$N/cm or less.

24 Claims, No Drawings

COATING COMPOSITION, METHOD FOR PRODUCING THE SAME, CURED PRODUCT AND COATING FILM

FIELD OF THE INVENTION

The present invention relates to a coating composition excellent in dispersion stability of a photocatalyst, excellent in storage stability even when the composition has a high concentration, giving a coating layer excellent in durability and adhesion, and having a photocatalytic function, a method for producing the same, a cured product and a coating film.

BACKGROUND OF THE INVENTION

In recent years, compositions for coating have been desired which can form coating layers excellent in resistance to weather, resistance to stains and resistance to chemicals, and moreover high in hardness. Furthers coating compositions having the increased versatility will be desired in future. So far, compositions comprised of silyl group-containing vinyl resins and organosilane compounds are described in Japanese Patent Laid-open Publication (Hei) 01-69673 and Japanese Patent Laid-open Publication (Hei) 01-69674. However, they are all limited in substrates. Such compounds are further described in Japanese Patent Laid-open Publication (Hei) 04-108172, Japanese Patent Laid-open Publication (Hei) 04-117473 and so forth. However, detailed coating specifications are not described therein, although subject substrates cover a wide range.

On the other hand, organosilane coating materials have technically been developed for use as maintenance-free coating materials excellent in resistance to weather (sunlight) and resistance to stains. The performance required for such organosilane coating materials increasingly become severe. In recent years, coating materials have been desired which can form coating layers excellent in coating appearance, adhesion, resistance to weather, heat, alkalis, organic chemicals, moisture and (hot) water, insulation durability, abrasion resistance and resistance to stains, and high in hardness In particular, for improving resistance to stains, it is known that hydrophilization of surfaces of coating layers is suitable. For example, methods of adding hydrophilic materials or water-soluble materials to the coating composition are proposed. According to such methods, however, the hydrophilic materials or water-soluble materials are gradually deteriorated by light, or washed away with water, which makes it difficult to maintain the hydrophilicity of the surfaces of the coating layers at a sufficient level for a long period of time.

In recent years, many compositions for coating in which photocatalytic components are Compounded have been proposed. For example, a method for forming an inorganic coating layer (Japanese Patent Laid-open Publication (Hei) 8-259891) is known in which 20 to 200 parts by weight of tetraalkoxysilane, 100 parts by weight of trialkoxysilane and 0 to 60 parts by weight of dialkoxysilane are used as raw materials, and a coating layer obtained from a mixed solution of an inorganic paint and a powder having a photocatalytic function is treated with an acid or an alkali, the inorganic paint being prepared from the raw materials and having a polystyrene-converted weight-average molecular weight of 900 or more, as well as a titanium oxide coating layer forming composition for a photocatalyst comprising titanium oxide, a hydrolyzate of a hydrolytic silicon compound (an alkyl silicate or a silicon halide) and a solvent (water or an alcohol) (Japanese Patent Laid-open Publication (Hei) 9-164334), and a surface treatment composition for imparting antibacterial and mildewproofing properties comprising a silicon compound having at least two alkoxyl groups, a titanium compound or zirconium compound having at least two alkoxyl groups and a hydrophilic inorganic powder such as alkoxysilane- and/or polysiloxane-treated titanium oxide having a guanidyl group (Japanese Patent Laid-open Publication (Hei) 8-176527).

However, these compositions and mixed solution for coating layer formation substantially aim at antibacterial and mildewproofing properties, deodorization and decomposition of injurious matter due to the photocatalytic components or alkoxysilane- and/or polysiloxane components having a guanidyl group. However, accompanying with above functions, coating layer performances required for organosilane coating materials, including hardness, adhesion, and resistance to alkalis, organic chemicals, weather and stains, are not studied overall.

On the other hand, as coating compositions satisfying the required performance to some degree, there are proposed a composition in which a partial condensate of organosilane, a dispersion of colloidal silica and a silicone-modified acrylic resin are compounded (Japanese Patent Laid-open Publication (Sho) 60-135465), a composition in which a condensate of organosilane, a chelate compound of zirconium alkoxide and a hydrolytic silyl group-containing vinyl resin are compounded (Japanese Patent Laid-open Publication (Sho) 64-1769), and a compound in which a condensate of organosilane, a colloidal alumina and a hydrolytic silyl group-containing vinyl resin are compounded (U.S. Pat. No. 4,904,721)

However, coating layers obtained from the compositions disclosed in Japanese Patent Laid-open Publication (Sho) 60-135465 and U.S. Pat. No. 4,904,721 described above have the disadvantage that their luster is decreased by long-term irradiation of ultraviolet rays. Also, the composition disclosed in Japanese Patent Laid-open Publication (Sho) 64-1769 described above is insufficient in storage stability, and has the problem that an increase in solid concentration is liable to cause gelation within a short period of time.

Further, the present inventors have already proposed a coating composition containing a hydrolyzate and/or a partial condensate of organosilane, a vinyl resin having a hydrolytic silyl group and/or a silyl group having a silicon atom bonded to a hydroxyl group, a metallic chelate compound, and a β-diketone and/or a β-keto ester (Japanese Patent Laid-open Publication (Hei) 5-345877). Although the composition is excellent in the balance of the above-mentioned coating layer performances required for any organosilane coating material, it is also required that these performances are further improved.

Furthermore, in Japanese Patent Laid-open Publication (Hei) 9-227161, a self-cleaning film provided with a surface layer containing substantially transparent photocatalytic oxide particles is disclosed. However, the film is deteriorated in quality by a photocatalytic function for itself, thus a problem with regard to long-term durability is sometimes raised. Furthermore, in Patent Laid-open Publication (Hei) 9-313687, a photocatalytic sheet provided with a photocatalytic layer on its surface and coated with an adhesive agent on the back thereof, thereby attaching it to another device or member to offer a photocatalytic function is proposed. However, the sheet is similarly deteriorated in quality by a photocatalytic function for itself, bringing a problem with regard to long-term durability On the other hand, in the case that a photocatalyst (titanium dioxide) is used in the coating composition as an aqueous dispersion, the strong acidic aqueous dispersion is easily dispersible in an alcohol relatively high in hydrophobicity (for example, i-propyl alcohol or i-butyl alcohol), because of its excellent dispersion stability. However, the strong acidic aqueous dispersion brings problems such as corrosiveness to machines used in the production or coating of the resultant composition and the environmental safety. On the contrary, when aqueous titanium dioxide dispersion having a pH of 3 to 9 is used considering these problems, the problem of poor dispersion stability in the above-mentioned hydrophobic alcohol is encountered. When a solvent which can stabilize aqueous titanium dioxide dispersion having a pH of 3 to 9, for example, diethylene glycol monoethyl ether, is used for solving this problem, a cissing phenomenon of the composition is sometimes observed on an undercoat layer such as intermediate layer or a substrate, because this solvent has high surface tension.

SUMMARY OF THE INVENTION

The present invention has been made against the background of the above-mentioned conventional technical problems, and it is an object of the invention to provide a coating composition excellent in dispersion stability of a photocatalyst even in a highly hydrophobic alcohol such as i-propyl alcohol, excellent in storage stability even when the composition has a high concentration, giving a coating layer excellent in durability and adhesion, and having a photocatalytic function.

Another object of the present invention is to provide a method for producing the above-mentioned coating composition.

Still another object of the present invention is to provide a cured product obtained from the above-mentioned coating composition.

A further object of the present invention is to provide a coating film obtained from the above-mentioned coating composition.

According to the present invention, there is provided a coating composition comprising:

(a) at least one component selected from the group consisting of an organosilane represented by the following general formula (1), a hydrolyzate of the organosilane and a condensate of the organosilane (hereinafter also referred to as "a hydrolyzate/condensate of the oxganosilane");

(b) an organosiloxane oligomer having an SiO bond and a weight average molecular weight of 300 to 10,000;

(c) a photocatalyst; and (d-1) an organic solvent having a surface tension at 20° C. of 260 $\mu$N/cm or less:

(1)

wherein, $R^1$, which may be the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2.

The above-mentioned coating composition may further comprise (e) a polymer containing a silyl group having a silicon atom bound to a hydrolytic group and/or a hydroxyl group.

The above-mentioned composition (a) maybe (a-1) at least one component selected from the group consisting of an organosilane represented by general formula (1) (wherein n is 1 or 2, and at least one of R groups is an epoxy group-containing substituted derivative), a hydrolyzate of the organosilane and a condensate of the organosilane; and (a-2) at least one component selected from the group consisting of an organosilane represented by general formula (1) (wherein no epoxy group is contained in $R^1$), a hydrolyzate of the organosilane and a condensate of the organosilane.

The above-mentioned component (b) may have a group represented by general formula —(RO)p—(R'O)q—R" (wherein R and R', which may be the same or different, represent alkyl groups each having 1 to 5 carbon atoms, R" represents a hydrogen atom or an alkyl group having 1 to 5 carbon atoms, and p+g is from 2 to 30), and a silyl group having a silicon atom bound to a hydrolytic group and/or a hydroxyl group.

Further, the present invention provides a method for producing a coating composition which comprises hydrolyzing and/or condensing at least one selected from the group consisting of:

(a) an organosilane represented by the above-mentioned general formula (1);

(b) an organosiloxane oligomer having an SiO bond and a weight average molecular weight of 300 to 100,000; and (c) a polymer containing a silyl group having a silicon atom bound to a hydrolytic group and/or a hydroxyl group, in the presence of (c') an aqueous dispersion of a photocatalyst having a pH of 3 to 9 and (d') an organic solvent in which the content of an organic solvent having a surface tension at 20° C. of more than 260 $\mu$N/cm is 20% by weight or less based on the whole organic solvent, The above-mentioned component (a) may be the above-mentioned component (a-1) and/or (a-2).

Still further, the present invention relates to a cured product obtained by coating and drying the above-mentioned coating composition or the composition obtained by the above-mentioned production method.

Yet still further, the present invention is directed to a cured product having a dry coating layer comprising any one of undercoating compositions described in (i) to (iv) shown below, and having thereon a dry coating layer comprising the above-mentioned coating composition or the coating composition obtained by the above-mentioned production method.

(i) An undercoating composition containing the above-mentioned components (a) and (e);

(ii) An undercoating composition containing the above-mentioned components (a) and (e), and (f) colloidal silica and/or colloidal alumina;

(iii) An undercoating composition containing the above-mentioned components (a) and (e), and (g) colloidal cerium oxide and/or colloidal zinc oxide; and (iv) An undercoating composition containing the above-mentioned components (a), (e), (f) and (g).

The present invention further provides a coating film having a dry coating layer comprising any one of undercoating compositions described in (i) to (iv) described above, and having thereon a dry coating layer comprising the above-mentioned coating composition or the coating composition obtained by the above-mentioned production method.

DETAILED DESCRIPTION OF THE INVENTION

Coating Composition

The coating composition of the present invention will be described for each constituent feature.

Component (a):

Component (a) is at least one selected from an organosilane represented by the above-mentioned general formula (1) (hereinatfer referred to as "organosilanes (1)"), a hydrolyzate of the organosilane (1) and a condensate of the organosilane (1), and acts as an binder in the composition of the invention. That is to say, component (a) may be one or two of these three groups or a mixture of all the three groups.

The above-mentioned hydrolyzate of organosilane (1) does not require that two to four $OR^2$ groups generally contained in organosilane (1) have all been hydrolyzed. For example, one in which only one of the groups have been hydrolyzed or one in which two or more of the groups have been hydrolyzed, or a mixture thereof may be used.

Further, the above-mentioned hydrolyzate may be a condensate of organosilane (1) in which a part thereof is condensed. The above-mentioned condensate of organosilane (1) is one in which silanol groups in the hydrolyzate of organosilane (1) have been condensed to form an Si—O—Si bond. In the invention, however, it is not necessary that the silanol groups have all been condensed, and the concept of the condensate includes one in which only a few of the silanol groups have been condensed and a mixture of condensates whose levels of condensation are different.

When the hydrolyzate of organosilane (1) is used as component (a) as described above, organosilane (1) can be previously hydrolyzed to use the hydrolyzate as component (a). However, when mixed with the remainder components to prepare the composition, organosilane (1) is preferably hydrolyzed by addition of a proper amount of water to form component (a).

In particular, it is preferred that organosilane (1) is hydrolyzed and condensed in the presence of the following components (b) to (d), as described later.

In the present invention, components (a) can be used either alone or as a mixture of two or more of them.

In general formula (1), the monovalent organic groups of $R^1$ each having 1 to 10 carbon atoms include, for example, alkyl groups such as methyl, ethyl, n-propyl, i-propyl, n-butyl, i-butyl, sec-butyl, t-butyl, n-haxyl, n-heptyl, n-octyl and 2-ethylhexyl; acyl groups such as acetyl, propionyl, butyryl, valeryl, benzoyl, toluoyl and caproyl; a vinyl group; an aryl group; a cyclohexyl group; a phenyl group; an epoxy group, a glycidyl group; a (meth)acryloxy group; an ureido group; an amido group; a fluoroacetoamido group; an isocyanate group; and their substituent derivatives.

The substituent groups in the substituent derivatives of $R^1$ include, for example, halogen atoms, substituted or not-substituted amino groups, a hydroxyl group, a mercapto group, an isocyanate group, a glycidoxy group, a 3,4-epoxycyclohexyl group, a (meth)acryloxy group, an ureido group, and ammonium bases. The number of carbon atoms in the substituent derivative of $R^1$ is 10 or less, including the carbon atoms in the substituent group.

When two $R^1$ groups are present in general formula (1), they may be the same or different.

The alkyl groups of $R^2$ each having 1 to 5 carbon atoms include, for example, methyl, ethyl, n-propyl, i-propyl, n-butyl, sec-butyl, t-butyl and n-pentyl, and the acyl groups each having 1 to 6 carbon atoms include, for example, acetyl, propionyl, butyryl, valeryl and caproyl.

A plurality of $R^2$ groups existing in general formula (1) may be the same or different.

Specific examples of such organosilanes (1) include methyltriacetyloxysilane and dimethyldiacetyloxysilane, as well as tetraalkoxysilanes such as tetramethoxysilane, tetraethoxysilane, tetra-n-propoxysilane, tetra-i-propoxysilane and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, pentyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane and 3-ureidopropyltriethoxysilane; and dialkoxysilanes such as dimethyldimethoxysilane, dimethyldiethoxysilane, diethyldimethoxysilane, diethyldiethoxysilane, methylethyldimethoxysilane, methylethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane, 3-glycidoxypropylmethyldimethoxysilane, 3-glycidoxypropylmethyldiethoxysilane, 2-(3,4-epoxycyclohexyl)ethylmethyldimethoxysilane, 2-(3,4-epoxycyclohexyl)ethylmethyldiethoxysilane, 3-glycidoxypropylethyldimethoxysilane, 3-glycidoxypropylethyldiethoxysilane, 2-(3,4-epoxycyclohexyl)ethylethyldimethoxysilane, 2-(3,4-epoxycyclohexyl)ethylethyldiethoxysilane, 3-aminopropylmethyldimethoxysilane and 3-aminopropylethyldiethoxysilane.

Of these, the alkoxysilanes and the dialkoxysilanes are preferred. The trialkoxysilanes are preferably methyltrimethoxysilane and methyltriethoxysilane, and the dialkoxysilanes are preferably dimethyldimethoxysilane and dimethyldiethoxysilane.

In the present invention, only the trialkoxysilane, or a combination of 40 to 95% by weight of the trialkoxysilane and 60 to 5% by weight of the dialkoxysilane (in terms of the weight of the complete hydrolyzate/condensate) is preferred as organosilane (1). The use of the dialkoxysilane in combination with the trialkoxysilane causes a resultant coating layer to be softened and improved in resistance to alkalis.

The term "complete hydrolyzate/condensate" described above means a product in which 100% of alkoxyl groups of trialkoxysilane and dialkoxysilane are hydrolyzed, which are further completely condensed to give a siloxaine structure.

Organosilane (1) is used as it is, or as the hydrolyzate/condensate. When organosilane (1) is employed as the hydrolyzate/condensate, it can also be previously hydrolyzed and condensed to use it as component (a). However, it is preferred that a proper amount of water is added in mixing organosilane (1) with the remainder components to prepare the composition as described later, thereby hydrolyzing and condensing organosilane (1) to yield component (a).

When the condensate is used as component (a), the polystyrene-converted weight-average molecular weight (hereinafter referred to as "Mw") of the condensate is preferably from 300 to 100,000, and more preferably from 500 to 50,000.

Component (a-1):

Component (a-1) is at least one component selected from the group consisting of an organosilane represented by general formula (1) (wherein n is 1 or 2, and at least one of $R^1$ groups is an epoxy group-containing substituted derivative) (hereinafter also referred to as "organosilane (a-1)"), and a hydrolyzate/condensate of the organosilane.

Specific examples of such organosilanes include trialkoxysilanes such as 3-glycidoxypropyltrimethoxysilane, 3-glycidoxypropyltriethoxysilane, 2-(3,4-epoxycyclohexyl)ethyltrimethoxysilane and 2-(3,4-epoxycyclohexyl)ethyltriethoxysilane; and dialkoxysilanes such as 3-glycidoxypropylmethyldimethoxysilane, 3-glycidoxypropylmethyldiethoxysilane, 2-(3,4-epoxycyclohexyl)ethylmethyldimethoxysilane, 2-(3,4-epoxycyclohexyl)ethylmethyldiethoxysilane, 3-glycidoxypropylethyldimethoxysilane, 3-glycidoxypropylethyldiethoxysilane, 2-(3,4-epoxycyclohexyl)ethylethyldimethoxysilane and 2-(3,4-epoxycyclohexyl)ethylmethyldiethoxysilane.

Of these, the trialkoxysilanes are preferred. The trialkoxysilanes are preferably 3-glycidoxypropyltrimethoxysilane and 3-glycidoxypropyltriethoxysilane.

These components (a-1) may be used either alone or as a mixture of two or more of them.

Component (a-2):

Component (a-2) is at least one component selected from the group consisting of an organosilane represented by general formula (1) (wherein no epoxy group is contained in $R^1$) (hereinafter also referred to as "organosilane (a-2)"), and a hydrolyzate/condensate of the organosilane. That is to say, organosilane (a-2) is organosilane (1) other than organosilane (a-1).

Specific examples of such organosilanes (a-2) are organosilanes (1) excepting the above-mentioned organosilanes (a-1), so that the description thereof is omitted.

Of these, the trialkoxysilanes and the dialkoxysilanes are preferred as component (a-2). The trialkoxysilanes are preferably methyltrimethoxysilane and methyltriethoxysilane, and the dialkoxysilanes are preferably dimethyldimethoxysilane and dimethyldiethoxysilane.

In the coating composition of the present invention, the ratio of component (a-1) to component (a-2) in component (a) is preferably from 1/99 to 50/50, and more preferably from 5/95 to 35/65 (% by weight, in terms of the weight of the complete hydrolyzate/condensate). The use of component (a-1) as component (a) can improve the stability of titanium oxide.

The term "complete hydrolyzate/condensate" described above means a product in which 100% of $R^2O$— groups of component (a-1) and component (a-2) are hydrolyzed to SiOH groups, which are further completely condensed to give a siloxane structure.

Component (b):

Component (b) is a siloxane oligomer having an SiO bond and a weight average molecular weight of 300 to 100,000. That is to say, component (b) has a condensate structure of component (a). Although there is no particular limitation on a method for producing component (b), chlorosilane condensates and alkoxysilane condensates are mainly preferred. Components (b) also include ones in which the above-mentioned chlorosilane condensates and alkoxysilane condensates are modified, for example, ones in which the following various functional groups are introduced into ends or side chains thereof, In the above-mentioned siloxane oligomers, the functional groups introduced into the ends or the side chains of the siloxanes include groups represented by —(RO)p—(R'O)q—R" (wherein R and R', which may be the same or different, represent alkyl groups each having 1 to 5 carbon atoms, R" represents a hydrogen atom or an alkyl group having 1 to 5 carbon atoms, and p+q is from 2 to 30), as well as a hydroxyl group, halogen atoms and organic groups each having 1 to 15 carbon atoms (such as alkyl, acyl, alkoxyl, alkoxysilyl, vinyl, allyl, acetoxyl, acetoxysilyl, cycloalkyl, phenyl, glycidyl, (meth)acryloxy, ureido, amido, fluoroacetamide and isocyanate). These groups may be partially hydrolyzed or condensed, and may be substituted derivatives thereof.

The above-mentioned halogen atoms include fluorine and chlorine.

The alkyl groups each having 1 to 15 carbon atoms include methyl, ethyl, n-propyl, i-propyl, n-butyl, i-butyl, sec-butyl, t-butyl, n-hexyl, n-heptyl, n-octyl, n-nonyl, n-decyl, undecyl, dodecyl, tridecyl, tetradecyl, hexadecyl, heptadecyl, octadecyl and 2-ethylhexyl. The acyl groups include acetyl, propionyl, butylyl, valeryl, benzoyl and toluoyl. The alkoxyl groups include methoxy, ethoxy, propoxy and butoxy, and alkoxysilyl groups include methoxysilyl, ethoxysilyl, propoxysilyl and butoxysilyl.

The groups represented by —(RO)p—(R'O)q—R" are polyoxyalkylene groups such as polyoxyethylene, polyoxypropylene and poly(oxyethylene/oxypxopylene). Component (b) has such an end functional group, which causes a co-condensate of component (a) and component (b) to have hydrophilicity. In addition, a polyoxyalkylene portion is liable to be adsorbed by component (c), so that the dispersion stability of component (c) is improved.

Examples of the substituent groups in the above-mentioned substituted derivatives include halogen atoms, substituted or unsubstituted amino groups, a hydroxyl group, a mercapto group, an isocyanato group, a glycidoxy group, a 3,4-epoxycyclohexyl group, a (meth)acryloxy group, a ureido group, ammonium salt groups and keto ester groups.

The weight average molecular weight (hereinafter also referred to as "Mw") of component (b) is preferably from 300 to 100,000, and particularly preferably from 600 to 50,000. Less than 300 sometimes results in poor flexibility of the resultant coating layer, whereas exceeding 100,000 unfavorably lead to poor storage stability of the resultant coating composition in some cases.

A mixture of two kinds of oligomers different in Mw may be used as component (b) for example, a mixture of an oligomer having an Mw of 400 to 2,800 and an oligomer having an Mw of 3,000 to 50,000 may be used.

Components (b) are commercially available as modified silicone oil manufactured by Dow Corning Toray Silicone Co., Ltd., modified silicone oil manufactured by Toshiba Silicone Co., modified silicone oil manufactured by Shin-Etsu Chemical Co., Ltd., and a modified silicon oligomer manufactured by Nippon Unicar Company Limited. They may be used as such or as condensates.

In the present invention, components (b) may be used either alone or as a mixture of two or more of them.

As to the amounts of component (a) and component (b) used, the amount of component (a) is from 5 to 95% by weight, and preferably from 10 to 90% by weight, and the amount of component (b) is from 5 to 95% by weight, and preferably from 10 to 90% by weight in terms of the weight of the complete hydrolyzate/condensate (with the proviso that (a)+(b)=100% by weight). When the amount of component (a) is less than 5% by weight, the resultant coating composition sometimes becomes poor in curing properties. On the other hand, exceeding 95% by weight results in decreased crack resistance in some cases.

The term "complete hydxolyzate/condensate" described above means a product in which 100% of $R^2O$— groups of component (a) or component (b) are hydrolyzed to SiOH groups, which are further completely condensed to give a siloxane structure.

In the composition of the present invention, component (b) is usually co-hydrolyzed and co-condensed together with component (a) described above.

In this case, the amount of water used for hydrolysis/condensation of organosilane (1) and component (b) is usually 0.1 mole or more, and preferably from about 0.2 to about 2 moles, based on mole of the total amount of $OR^2$ contained in organosilane (1) and component (b). When the above-mentioned component (a-1) and component (a-2) are used as component (a), the amount of water used for hydrolysis/condensation of organosilane (a-1), organosilane (a-2) and component (b) is usually 0.1 mole or more, and preferably from about 0.2 to about 2 moles, based on mole of the total amount of $OR^2$ contained in organosilane (a-1), organosilane (a-2) and component (b).

When an aqueous dispersion of a photocatalyst is used as component (c), water existing in the aqueous dispersion can be used for hydrolysis of organosilane (1) and component (b).

In the hydrolysis/reduction reaction in this case, that is to say, in the reaction in the preparation of the composition of the present invention, the reaction temperature is from 20° C. to 80° C., preferably from 30° C. to 80° C., and more preferably from 40° C. to 70° C., and the reaction time is from about 0.5 hour to about 10 hours, and preferably from about 1 hour to about 7 hours.

In the composition of the present invention, when component (a) and component (b) are co-hydrolyzed and co-condensed, the weight average molecular weight of the co-hydrolyzate/co-condensate is usually from about 500 to about 100,000, and preferably from about 600 to about 80,000.

Photocatalyst (C):

Preferred examples of photocatalysts (c) include powders and/or sols of semiconductors having photocatalytic ability.

The semiconductors having photocatalytic ability include, for example, $TiO_2$, $TiO_3$, $SrTiO_3$, $FeTiO_3$, $WO_3$, $SnO_2$, $Bi_2O_3$, $In_2O_3$, $ZnO$, $Fe_2O_3$, $RuO_2$, $CdO$, $Cds$, $CdSe$, $GaP$, GaAs, $CdFeO_3$, $MoS_2$, $LaRhO_3$, GaN, CdP, ZnS, ZnSe, ZnTe, $Nb_2O_5$, $ZrO_2$, InP, GaAsP, InGaAlP, AlGaAs, PbS, InAS, PbSe and InSb. Of these, preferred are $TiO_2$ and ZnO, and particularly preferred is $TiO_2$ containing an anatase type structure.

In the present invention, it has become clear that the photocatalytic ability of component (c) hydrophilizes a surface of the coating layer for a short period of time even by poor light, resulting in significant improvement in the resistance to stains of the coating layer without substantial impairment of other coating layer performances. Moreover, component (c) is usually bonded to the above-mentioned component (a) and so forth in the coating layer obtained from the composition of the present invention, so that the hydrophilicity and resistance to stains of the coating layer are maintained for a long period of time.

Further, it is desirable to use the above-mentioned semiconductors in powder and/or sol form. In detail, any one of the three kinds of a powder, an aqueous sol dispersed in water, and a solvent sol dispersed in a polar solvent such as isopropyl alcohol or a nonpolar solvent such as toluene is desirably used. In the case of the solvent sol, the solvent sol may be further diluted with water or a solvent, depending on the dispersion stability of the semiconductors. It is preferred that the average particle size of the semiconductors in these existing forms is as small as possible from the viewpoint of photocatalystic ability. In this case, when the average particle size of the semiconductors is 0.3 μm or more, the coating layers are liable to become opaque by the light covering function of the semiconductors. Less than 0.3 μm tends to cause the coating layers to be transparent. Accordingly, the average particle size of the semiconductors can be properly selected depending on the purpose of the compositions.

When component (a) is the aqueous sol or the solvent sol, the solid concentration is preferably 50% by weight or less, and more preferably 40% by weight or less.

As component (C) used in the present invention, it is desirable to use aqueous dispersion (c') preferably having a pH of 3 to 9, as described in the method for producing the composition of the present invention given later. The use of aqueous dispersion (c') having a pH of 3 to 9 preferably results in reduced corrosiveness to a machine used in the production or coating of the resultant composition and decreased environmental problems.

As a method for adding component (c) to the composition, component (c) may be added after the preparation of a composition comprising the above-mentioned component (a) and composition (b), and components (d) to (f) described later, or can also be added in preparing this composition to hydrolyze and condense component (a) in the presence of component (c). When component (c) is added in preparing the composition, the semiconductor compound in component (c) can be co-condensed with component (a) to particularly improve the long-term durability of the resultant coating layer. When component (c) is the aqueous dispersion, it is preferably added in preparing the composition. Also when the viscosity in a system is increased by compounding of component (h) described later, the addition of component (c) in preparing the composition is preferred. Further, when the composition of the intention is used as an enamel containing a coloring component, toning may be carried out after the addition of component (c) to the composition, or component (c) and the coloring component may be added to the composition at the same time.

In particular, as described later, it is preferred that component (a) and component (b) are hydrolyzed and condensed in the presence of (c') a photocatalyst dispersion having a pH of 3 to 9 and (d') an organic solvent in which the content of an organic solvent having a surface tension at 20° C. of more than 260 μN/cm is 20% by weight or less based on the whole organic solvent. This causes photocatalyst (c) to be co-condensed with component (a). Thus, the resultant composition can be easily dispersed in an alcohol relatively high in hydrophobicity (such as i-propyl alcohol or i-butyl alcohol), and the wettability of the resultant composition to a substrate is improved, resulting in excellent film-forming properties of the resultant coating layer. Further, the composition excellent in storage stability is obtained.

In the invention, components (a) can be used either alone or as a mixture of two or more of then.

The amount of component (c) used is usually from 1 to 500 parts by weight, and preferably from 5 to 400 parts by weight, in terms of the solid content, based on 100 parts by weight of the complete hydrolyzate/condensate of components (a) and (b). Less than 1 part by weight results in the lack of the stain proof effect due to the photocatalytic reaction in some cases, whereas exceeding 500 parts by weight sometimes results in a reduction in film-forming properties of the resultant coating composition.

Organic Solvent (d):
Component (d-1);

Component (d-1) is an organic solvent having a surface tension at 20° C. of 260 μN/cm or less. Such organic solvent (d-1) is low in surface tension, so that the resultant composition has good wettability to a substrate. Accordingly, a so-called "cissing phenomenon" is difficult to occur, and the resultant coating layer is excellent in film-forming properties.

The organic solvents (d-1) having a surface tension at 20° C. of 260 μN/cm or less include methyl alcohol, ethyl alcohol, n-propyl alcohol, i-propyl alcohol, i-butyl alcohol, methyl ethyl ketone, methyl isobutyl ketone and butyl acetate.

Component (d-2):

Component (d-2) is an organic solvent having a surface tension at 20° C. of more than 260 μN/cm. In the composition of the present invention, component (d') can also be used, which contains component (d-2) in an amount of 20% by weight or less based on the whole organic solvent, in addition to the above-mentioned component (d-1). When component (d-2) is used in an amount of more than 20% by weight based on the whole organic solvent, the surface tension of the whole organic solvent is sometimes increased too high, which may cause the resultant composition to bring about cissing to a substrate.

Compositions (d-2) include ethylene glycol monoethyl ether, ethylene glycol monobutyl ether, diethylene glycol monoethyl ether and cyclohexanone.

That is to say, when two or more kinds of organic solvents are used in combination in organic solvent (d) of the present invention, the average surface tension of the organic solvents is only required to be 260 μN/cm or less. In other words, it is preferred that (d') an organic solvent in which the content of an organic solvent having a surface tension at 20° C. of more than 260 μN/cm is 20%. by weight or less based on all organic solvents added in the above-mentioned hydrolysis/condensation, in the storage of the composition and in coating.

The above-mentioned organic solvents (d) may be used either alone or as a combination of two or more of them.

Further, the amount of organic solvent (d) used can be appropriately increased or decreased depending on the solid concentration of the composition of the present invention, as described later.

Silyl Group-Containing Polymer (e):

Component (e) is a polymer in which a silyl group having a silicon atom bonded to a hydrolytic group and/or a hydroxyl group (hereinafter referred to as a "specific silyl group"), preferably at an end and/or a side chain of a molecular chain of the polymer.

In the composition of the present invention, silyl group-containing polymer (e) is a component that brings about excellent coating layer performances by co-condensation of the hydrolytic group and/or the hydroxyl group of the silyl group with component (a) described above in curing the coating layer.

The content of silicon atoms in component (e) is generally from 0.001 to 20% by weight, and preferably from 0.01 to 15% by weight, based on the whole component (e).

The preferred specific silyl group is a group expressed by the following general formula (2):

(2)

wherein, X represents a hydrolytic group such as a halogen atom, an alkoxyl group, an acetoxy group, a phenoxy group, a thioalkoxyl group or an amino group, or a hydroxyl group, $R^3$ represents a hydrogen atom, an alkyl group having 1 to 10 carbon atoms or an aralkyl group having 1 to 10 carbon atoms, and i is an integer ranging from 1 to 3.

Component (e) can be produced, for example, by methods described in the following (A) and (B):

(A) a method of allowing a hydrosilane compound corresponding to the above-mentioned general formula (2) (hereinafter referred to as "hydrosilane compound (A)") to react with a carbon-carbon double bond in a carbon-carbon double bond-containing vinyl polymer (hereinafter referred to as an "unsaturated vinyl polymer") by addition reaction; and (B) A method of copolymerizing a silane compound represented by the following general formula (5) (hereinafter referred to as "unsaturated silane compound (B)") with another vinyl monomer:

(3)

wherein, X, $R^6$ and i each have the same meanings as given for X, $R^3$ and i in general formula (2), and $R^4$ represents an organic group having a polymerizable double bond.

Hydrosilane compounds (A) used in the method of (A) described above include, for example, halogenated silanes such as methyldichlorosilane, trichlorosilane and phenyldichlorosilane, alkoxysilanes such as methyldimethoxysilane, methyldiethoxysilane, phenyldimethoxysilane, trimethoxysilane and triethoxysilane, acyloxysilanes such as methyldiacetoxysilane, phenyldiacetoxysilane and triacetoxysilane, and aminoxysilanes such as methyldiaminoxysilane, triaminoxysilane and dimethylaminoxysilane.

These hydrosilane compounds (A) can be used either alone or as a mixture of two or more of them.

There is no particular limitation on the unsaturated vinyl polymers used in the method of (A) described above, as long as they are polymers other than hydroxyl group-containing polymers. The unsaturated vinyl polymers can be produced by a method of (A-1) or (A-2) described below or a combination thereof.

(A-1) A method of (co) polymerizing a vinyl monomer having a functional group (hereinafter referred to as "functional group ($\alpha$)"), and then, reacting an unsaturated compound having a functional group which can react with functional group ($\alpha$) (hereinafter referred to as "functional group ($\beta$)") and a carbon-carbon double bond with functional group ($\alpha$) in the copolymer), thereby producing the unsaturated vinyl polymer having carbon-carbon double bonds at side chains of a molecular chain of the polymer.

(A-2) A method of (co) polymerizing a vinyl monomer, using a radical polymerization initiator having functional group ($\alpha$) (for example, 4,4-azobis-4-cyanovaleric acid or the like), or using a radical polymerization initiator and a chain transfer agent both having functional group ($\alpha$) (for example, 4,4-azobis-4-cyanovaleric acid and dithioglycolic acid), to synthesize a (co) polymer having functional group ($\alpha$) derived from the radical polymerization initiator or the chain transfer agent at one end or both ends of a molecular chain of the polymer, and then, reacting an unsaturated compound having functional group ($\beta$) and a carbon-carbon double bond with functional group ($\alpha$) in the (co) polymer, thereby producing the unsaturated vinyl polymer having the carbon-carbon double bond s) at one end or both ends of the molecular chain of the polymer.

Examples of the reactions of functional group ($\alpha$) with functional group ($\beta$) in the methods of (A-1) and (A-2) include the esterification reaction of a carboxyl group with a hydroxyl group, the ring-opening esterification reaction of a carboxylic anhydride group with a hydroxyl group, the ring-opening esterification reaction of a carboxyl group with an epoxy group, the amidation reaction of a carboxyl group with an amino group, the ring-opening amidation reaction of a carboxylic anhydride group with an amino group, the ring-opening addition reaction of an epoxy group with an amino group, the urethanation reaction of a hydroxyl group with an isocyanate group, and a combination of these reactions.

The vinyl monomers having functional group ($\alpha$) include, for example, unsaturated carboxylic acids such as (meth) acrylic acid, crotonic acid, maleic acid, fumaric acid, itaconic acid and so forth; unsaturated carboxylic anhydrides such as maleic anhydride and itaconic anhydride; hydroxyl group-containing vinyl monomars such as 2-hydroxyethyl (meth)acrylate, 2-hydroxypropyl (meth)acrylate, 3-hydroxypropyl (meth)acrylate, N-methylol (meth)acrylate and 2-hydroxyethyl vinyl ether; amino group-containing vinyl monomers such as 2-aminoethyl (meth)acrylate, 2-aminopropyl (meth)acrylate 3-aminopropyl (meth) acrylate and 2-aminoethyl vinyl ether; amineimido group-containing vinyl monomers such as 1,1,1-trimethylamine (meth)acrylimide, 1-methyl-1-ethylamine (meth)acrylimide, 1,1-dimethyl-1-(2-hydroxypropyl) amine(meth)acrylimide, 1,1-dimethyl-1-(2'-phenyl-2-hydroxyethyl) amine(meth) acrylimide and 1,1-dimethyl-1-(2'-hydroxy-2'-phenoxypropyl)amine(meth)acrylimide; and epoxy group-containing vinyl monomers such as glycidyl (meth)acrylate and allylglycidyl (meth)acrylate.

These functional group ($\alpha$)-containing vinyl monomers can be used either alone or as a mixture of two or more of them.

The other vinyl monomers copolymerizable with the functional group ($\alpha$)-containing vinyl monomers include, for example, (A) aromatic vinyl monomers such as styrene, $\alpha$-methylstyrene, 4-methylstyrene, 2-methylstyrene, 3-methylstyrene, 4-methoxystyrene, 2-hydroxymethylstyrene, 4-ethylstyrene, 4-ethoxystyrene 3,4-dimethylstyrene, 3,4-diethylstyrene, 2-chlorostyrene, 3-chlorostyrene, 4-chloro-3-methylstyrene, 4-t-butylstyrene, 2,4-dichlorostyrene, 2,6-dichlorostyrene and 1-vinylnaphthalene;

(B) (meth)acrylate compounds such as methyl (meth) acrylate, ethyl (meth)acrylate, propyl (meth)acrylate, n-butyl (meth)acrylate, i-butyl (meth)acrylate, amyl (meth)acrylate, i-amyl (meth)acrylate, hexyl (meth) acrylate, 2-ethylhexyl (meth)acrylate, n-octyl (meth) acrylate and cyclohexyl (meth)acrylate;

(C) multi-functional monomers such as divinylbenzene, ethylene glycol di(meth)acrylate, diethylene glycol di-(meth)acrylate, triethylene glycol di(meth)acrylate, tetraethylene glycol di(meth) acrylate, propylene glycol di(meth)acrylate dipropylene glycol di(meth)acrylate, tripropylene glycol di(meth)acrylate, tetrapropylene glycol di(meth) acrylate, butanediol di(meth) acrylate, hexanediol di(meth) acrylate, trimethylolpropane tri (meth) acrylate and pentaerythritol tetra(meth)acrylate;

(D) acid amide compounds such as (meth)acrylamide, N-methyl(meth)acrylamide, N-methoxymethyl(meth) acrylamide, N-butoxymethyl (meth) acrylamide, N,N-methylenebisacrylamide, diacetoneacrylamide, maleamide and maleimide;

(E) vinyl compounds such as vinyl chloride, vinylidene chloride and fatty acid vinyl esters;

(F) aliphatic conjugated dienes such as 1,3-butadiene, 2-methyl-1,3-butadinene, 2,3-dimethyl-1,3-butadiene, 2-neo-pentyl-1,3-butadinene, 2-chloro-1,3-butadinene, 2-cyano-1,3-butadinene, isoprene, straight-chain substituted conjugated pentadiene substituted by a substituent group such as an alkyl group, a halogen atom, a cyano group or the like and straight-chain or side-chain conjugated hexadinene;

(G) vinyl cyanide compounds such as acrylonitrile and methacrylonitrile;

(H) fluorine atom-containing monomers such as trifluoroethyl (meth)acrylate and pentadecafluorooctyl (meth) acrylate;

(I) piperidine monomers (ultraviolet stable group-containing monomers) such as 4-(meth)acryloyloxy-2,2,6,6,-tetramethylpiperidine, 4-(meth)acryloylamino-2,2,6,6-tetramethylpiperidine and 4-(meth)acryloyloxy-1,2,2,6,6-pentamethylpiperidine;

(J) ultraviolet absorptive group-containing monomers such as 2-(2-hydroxy-5'-methacryloxyethylphenyl)-2H-benzotriazole, 2-(2-hydroxy-3'-t-butyl-5'-methacryloxyethylphenyl)-2H-benzotriazole, 2-hydroxy-4-(methacyloyloxyethoxy)benzophenone and 2-hydroxy-4-(acryloyloxyethoxy)benzophenone; and besides, dicaprolactone.

It is preferred that the ultraviolet stable group-containing monomers and/or ultraviolet absorptive group-containing monomers are used as vinyl monomers employed in the preparation of component (e), because component (e) is prevented from deteriorating due to ultraviolet rays. In particular, when component (e) used in undercoating compositions described later is prepared, the ultraviolet stable group-containing monomers and/or ultraviolet absorptive group-containing monomers are preferably used, because the undercoating compositions and substrates (particularly, organic substrates) can be prevented from deteriorating due to ultraviolet rays.

These can be used either alone or as a combination of two or more of them.

The unsaturated compounds having functional group (β) and carbon-carbon double bonds include, for example, vinyl monomers similar to the functional group (α)-containing vinyl monomers, isocyanate group-containing unsaturated compounds obtained by the equimolar reaction of the above-mentioned hydroxyl group-containing vinyl monomers with diisocyanate compounds.

Specific examples of unsaturated silane compound (B) used in the method of (B) described above include CH$_2$=CHSi (CH$_3$) (OCH$_3$)$_2$, CH$_2$=CHSi (OCH$_3$)$_3$, CH$_2$=CHSi (CH$_3$)Cl$_2$, CH$_2$=CHSiCl$_3$, CH$_2$=CHCOO (CH$_2$)$_2$Si (CH$_3$) (OCH$_3$)$_2$, CH$_2$=CHCOO (CH$_2$)$_2$Si (OCH$_3$)$_3$, CH$_2$=CHCOO (CH$_2$)$_3$Si (CH$_3$) (OCH$_3$)$_2$, CH$_2$=CHCOO (CH$_2$)$_3$Si (OCH$_3$)$_3$, CH$_2$=CHCOO (CH$_2$)$_2$Si (CH$_3$) Cl$_2$, CH$_2$=CHCOO (CH$_2$)$_2$SiCl$_3$, CH$_2$=CHCOO (CH$_2$)$_3$Si (CH$_3$) Cl$_2$, CH$_2$=CHCOO (CH$_2$)$_3$SiC$_3$, CH$_2$=C (CH$_3$) COO (CH$_2$)$_2$Si (CH$_3$) (OCH$_3$)$_2$, CH$_2$=C (CH$_3$) COO (CH$_2$)$_2$Si (OCH$_3$)$_3$, CH$_2$=C (CH$_3$) COO (CH$_2$)$_3$Si (CH$_3$) (OCH$_3$)$_2$, CH$_2$=C (CH$_3$) COO (CH$_2$)$_3$Si (OCH$_3$)$_3$, CH$_2$=C (CH$_3$) COO (CH$_2$)$_2$Si (CH$_3$) Cl$_2$, CH$_2$=C (CH$_3$) COO (CH$_2$)$_2$SiCl$_3$, CH$_2$=C (CH$_3$) COO (CH$_2$)$_3$Si (CH$_3$)Cl$_2$, CH$_2$=C (CH$_3$) COO (CH$_2$)$_3$SiCl$_3$,

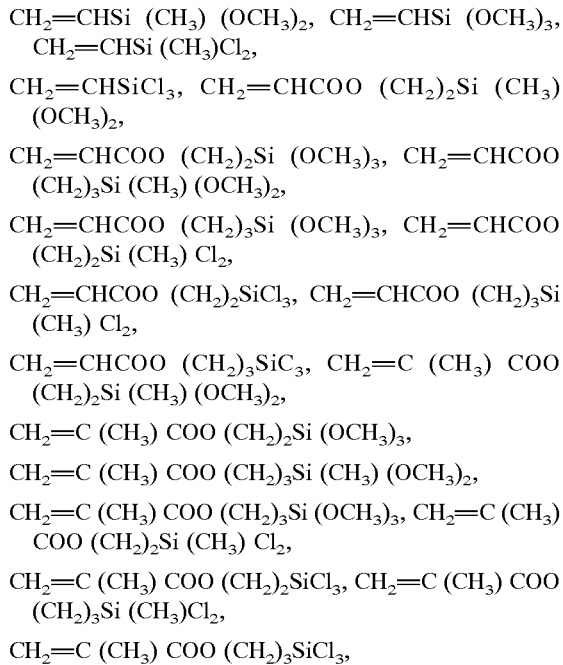

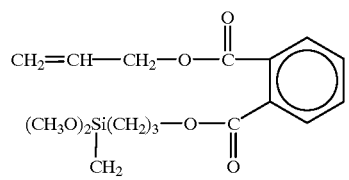

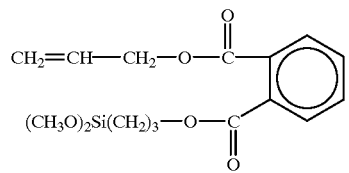

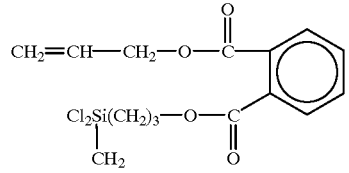 and

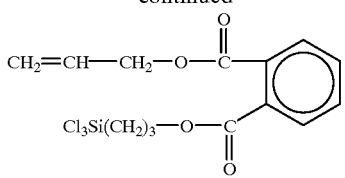

These can be used either alone or as a combination of two or more of them.

Further, the other vinyl monomers copolymerized with unsaturated silane compound (B) include, for example, one or more of the functional group (α)-containing vinyl monomers exemplified in the method of (A-1) described above and other vinyl monomers.

Further, other examples of component (e) include specific silyl group-containing epoxy resins and specific silyl group-containing polyester resins.

The above-mentioned specific silyl group-containing epoxy resins can be produced, for example, by allowing epoxy groups in epoxy resins such as bisphenol A type epoxy resins, bisphenol F type epoxy resins, hydrogenated bisphenol A type epoxy resins aliphatic polyglycidyl ethers and aliphatic polyglycidyl esters to react with aminosilanes, vinylsilanes, carboxysilanes and glycidylsilanes having the specific silyl groups.

Further, the above-mentioned specific silyl group-containing polyester resins can be produced, for example, by allowing carboxyl groups or hydroxyl groups contained in polyester resins to react with aminosilanes, carboxysilanes, or glycidylsilanes having the specific silyl groups.

The Mw of component (e) is preferably from 1,000 to 100,000, and more preferably from 2,000 to 50,000.

The amount of component (e) used in the composition of the present invention is generally from 2 to 900 parts by weight, preferably from 5 to 400 parts by weight, and more preferably from 10 to 200 parts by weight, based on 100 parts by weight of the total amount of the complete hydrolyzate/condensate of component (a) and component (b). In this case, when the amount of component (e) used is smaller than 2 parts by weight, the resultant coating layer is sometimes deteriorated in resistance to alkalis. On the other hand, exceeding 900 parts by weight results in the tendency of long-term weather resistance of the coating layer to be lowered.

The term "complete hydrolyzate/condensate" described above means a product in which 100% of R$^2$O-groups of component (a) and component (b) are hydrolyzed to SiOH groups, which are further completely condensed to give a siloxane structure.

Polymerization processes used in producing the above-mentioned component (e) include, for example, a process of adding a monomer or monomers all at once for polymerization, a process of polymerizing some of a monomer or monomers and then continuously or intermittently adding the remaining monomer or monomers, and a process of adding a monomer or monomers in succession from the beginning of polymerization. Also, any combination of the polymerizing processes may be employed. Preferred examples of the polymerization processes include solution polymerization. As solvents used in the solution polymerization, ordinary ones can be used. Of these, ketones and alcohols are preferred. In the polymerization, known polymerizing initiators, molecular weight modifiers, chelating agents and inorganic electrolytes can be used.

In the present invention, the above-mentioned component (e) can be used either alone or as a mixture of two or more obtained as described above.

In the composition of the present invention, components (f) to (j) described later can be further used as required.

Component (f):

Colloidal silica and/or colloidal alumina may be added to the composition of the present invention as component (f).

Component (f) can be added to the coating composition of the present invention, thereby reducing the content of a photocatalyst such as titanium oxide without a substantial decrease of photocatalytic activity (hydrophilization ability). Further, a reduction in the content of a photocatalyst having organic material degradation ability can improve the durability of the substrate/coating layer.

Furthermore, addition of component (f) to the undercoating composition described later can prevent the undercoating composition from deteriorating by the organic material degradation action due to the photocatalyst such as titanium oxide contained in the composition of the present invention, thereby securing adhesion of the undercoating composition to the composition of the present invention for a long period of time.

Colloidal silica or colloidal alumina is, for example, a dispersion of silica or alumina in water or an organic solvent. Usually, the average particle size is 1 μm or less, and preferably 0.5 μm or less, and the solid concentration is from about 10% to about 40% by weight.

Such colloidal silica includes for example, Methanol Silica Sol and Isopropanol Silica Sol manufactured by Nissan Chemical Industries Ltd.; and Oscal manufactured by Catalyst & Chemicals Industries Co., Ltd.

Colloidal alumina includes, for example, Alumina Sol-520, Alumina Sol-100 and Alumina Sol-200 manufactured by Nissan Chemical Industries Ltd.; and Alumina Clear Sol, Alumina Sol 10 and Alumina Sol 132 manufactured by Kawaken Fine Chemical Co., Ltd.

Colloidal silica and/or colloidal alumina components (f) described above can be used either alone or as a combination of two or more of them.

As component (f) contained in the composition of the present invention, colloidal silica is particularly preferred.

The amount of component (f) used in the composition of the present invention is generally from 5 to 500 parts by weight, preferably from 10 to 400 parts by weight, and more preferably from 20 to 200 parts by weight, in terms of the solid content, An based on 100 parts by weight of the total amount of the complete hydrolyzate/condensate of component (a), component (b) and component (e). when the amount of component (f) used exceeds 500 parts by weight, the resultant coating composition is deteriorated in film-forming properties, resulting in development of cracks and separation in some cases.

Component (g):

Component (g) is a catalyst for enhancing the hydrolysis and condensation reaction of component (a) and component (b).

The use of component (g) will accelerate the curing speed of the resultant coating layer and increase the molecular weight of polysiloxane produced by the polycondensation reaction of the organosilane component, hence allowing the resultant coating layer to be improved in strength, long-term and durability, and increasing the thickness of the coating layer and facilitating the coating operation.

Such component (g) is preferably an acidic compound, a basic compound, a salt compound, an amine compound, an organometallic compound and/or a partial hydrolyzate thereof (the organometallic compound and/or the partial hydrolyzate thereof is hereinafter collectively referred to as "an organometallic compound, etc.").

The above-mentioned acidic compounds include, for example, acetic acid, hydrochloric acid, sulfuric acid, phosphoric acid, alkyltitanic acids, p-toluenesulphonic acid and phthalic acid, and preferred is acetic acid.

Further, the above-mentioned basic compounds include, for example, sodium hydroxide and potassium hydroxide, and preferred is sodium hydroxide.

Furthermore, the above-mentioned salt compounds include, for example, alkali metal salts of naphthenic acid, octylic acid, nitrous acid, sulfurous acid, aluminic acid and carbonic acid.

The above-mentioned amine compounds include, for example, various modified amines used as hardeners for epoxy resins, as well as ethylenediamine, hexamethylenediamine, diethylenetriamine, triethylenetetramine, tetraethylenepentamine, piperidine, piperadine, m-phenylenediamine, p-phenylenediamine, ethanolamine, triethylamine, 3-aminopropyltrimethoxysilane, 3-aminopropyltriethoxysilane, 3-(2-aminoethyl) aminopropyltrimethoxysilane, 3-(2-aminoethyl) aminopropyltriethoxysilane, 3-(2-aminoethyl) aminopropylmethyldimethoxysilane, 3-aminopropyltrimethoxysilane, alkylamine salts and quaternary ammonium salts, and preferred are 3-aminopropyltrimethoxysilane, 3-aminopropyltriethoxysilane and 3-(2-aminoethyl) aminopropyltrimethoxysilane.

Further, the above-mentioned organometallic compounds, etc. include, for example, compounds expressed by the following general formula (4) (hereinafter referred to as "organometallic compounds (4)"), organometallic compounds of tetravalent tin each having 1 or 2 alkyl groups each having 1 to 10 carbon atoms, the alkyl groups being bonded to the same tin atom (hereinafter referred to as "organic tin compounds"), and partial hydrolyzates of these compounds.

$$M(OR^5)_r(R^5COCHCOR^7)_s \qquad (4)$$

wherein M represents zirconium, titanium or aluminum, $R^5$ and $R^6$, which may be the same or different, each represent monovalent hydrocarbon groups each having 1 to 6 carbon atoms such as ethyl, n-propyl, i-propyl, n-butyl, sec-butyl, t-butyl, n-pentyl, n-hexyl, cyclohexyl or phenyl, $R^7$ represents an alkoxyl group having 1 to 16 carbon atoms such as methoxy, ethoxy, n-propoxy i-propoxy, n-butoxy, sec-butoxy, t-butoxy, lauryloxy or stearyloxy, as well as a monovalent hydrocarbon group having 1 to 6 carbon atoms as is the case with $R^5$ and $R^6$, and r and s are integers ranging from 0 to 4, and (r+s)=(valence of M).

Specific examples of organometallic compounds (4) include:

(A) organic zirconium compounds such as tetra-n-butoxyzirconium, ethylacetoacetate-zirconium-tri-n-butylate, bis(ethylacetoacetate)-zirconium-di-n-butylate, tris(ethylacetoacetate)-zirconium-n-butylate, tetrakis(n-propylacetoacetate)-zirconium, tetrakis(acetylaceto-acetate)-zirconium, and tetrakis(ethylacetoacetate)-zirconium;

(B) organic titanium compounds such as tetra-i-propoxytitanium, bis(ethylacetoacetate)-titanium-di-i-propylate, bis(acetylacetate)-titanium-di-i-propylate and bis(acetylacetone)-titanium-di-i-propylate;

(C) organic aluminum compounds such as tri-i-propoxy-aluminum, ethylacetoacetate-aluminum-di-i-propylate, acetylacetonate-aluminum-di-i-propylate, bis (ethylaceto-acetate)-aluminum-i-propylate, bis (acetylacetonate)-aluminum-i-propylate, tris (ethylacetoacetate)-aluminum, tris(acetylacetonate)-aluminum and bis(ethylacetoacetate)-aluminum-monoacetylacetonate.

Of these organometallic compounds (4) and partial hydrolyzates thereof, preferred are ethylacetoacetate-zirconium-tri-n-butylate, bis (acetylacetonate)-titanium-di-i-propylate, ethylacetoacetate-aluminum-di-i-propylate, tris (ethylacetoacetate)-aluminum and (partial) hydolyzates of these compounds.

Specific examples of the organic tin compounds include:

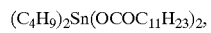
$(C_4H_9)_2Sn(OCOC_{11}H_{23})_2$,

$(C_4H_9)_2Sn(OCOCH=CHCOOCH_3)_2$,

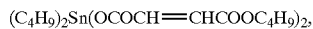
$(C_4H_9)_2Sn(OCOCH=CHCOOC_4H_9)_2$,

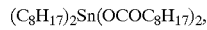
$(C_8H_{17})_2Sn(OCOC_8H_{17})_2$,

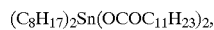
$(C_8H_{17})_2Sn(OCOC_{11}H_{23})_2$,

$(C_8H_{17})_2Sn(OCOCH=CHCOOCH_3)_2$,

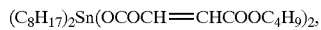
$(C_8H_{17})_2Sn(OCOCH=CHCOOC_4H_9)_2$,

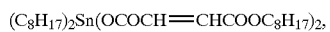
$(C_8H_{17})_2Sn(OCOCH=CHCOOC_8H_{17})_2$,

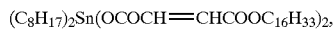
$(C_8H_{17})_2Sn(OCOCH=CHCOOC_{16}H_{33})_2$,

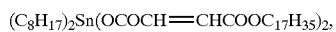
$(C_8H_{17})_2Sn(OCOCH=CHCOOC_{17}H_{35})_2$,

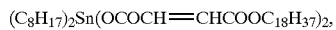
$(C_8H_{17})_2Sn(OCOCH=CHCOOC_{18}H_{37})_2$,

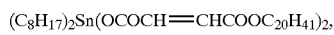
$(C_8H_{17})_2Sn(OCOCH=CHCOOC_{20}H_{41})_2$,

$(C_4H_9)_2SnOCOCH_3$
|
O
|
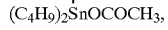
$(C_4H_9)_2SnOCOCH_3$,

$(C_4H_9)Sn(OCOC_{11}H_{23})_3$, and

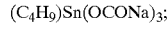
$(C_4H_9)Sn(OCONa)_3$;

mercaptide type organic tin compounds such as

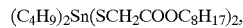
$(C_4H_9)_2Sn(SCH_2COOC_8H_{17})_2$,

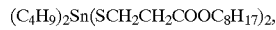
$(C_4H_9)_2Sn(SCH_2CH_2COOC_8H_{17})_2$,

$(C_8H_{17})_2Sn(SCH_2COOC_8H_{17})_2$,

$(C_8H_{17})_2Sn(SCH_2CH_2COOC_8H_{17})_2$,

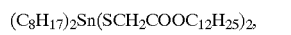
$(C_8H_{17})_2Sn(SCH_2COOC_{12}H_{25})_2$,

$(C_8H_{17})_2Sn(SCH_2CH_2COOC_{12}H_{25})_2$,

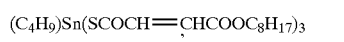
$(C_4H_9)Sn(SCOCH=CHCOOC_8H_{17})_3$

$(C_8H_{17})Sn(SCOCH=CHCOOC_8H_{17})_3$ and

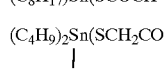
$(C_4H_9)_2Sn(SCH_2COOC_8H_{17})$
|
O
|
$(C_4H_9)_2Sn(SCH_2COOC_8H_{17})$;

sulfide type organic tin compounds such as

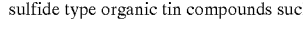
$(C_4H_9)Sn=S$, $(C_8H_{17})_2Sn=S$, and

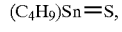
$(C_4H_9)Sn=S$
|
S
|
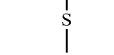
$(C_4H_9)Sn=S$;

-continued chloride type organic compounds such as

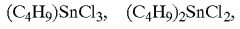
$(C_4H_9)SnCl_3$, $(C_4H_9)_2SnCl_2$,

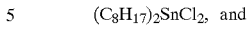
$(C_8H_{17})_2SnCl_2$, and

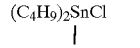
$(C_4H_9)_2SnCl$
|
S
|
$(C_4H_9)_2SnCl$; and organic tin oxides such as $(C_4H_9)_2SnO$ and $(C_8H_{17})_2SnO$, and reaction products of these organic tin oxides and ester compounds such as ethyl silicate, dimethyl maleate, diethyl maleate and dioctyl phthalate.

Components (g) can be used either alone or as a mixture of two or more of them, and can also be used as a mixture with zinc compounds or other reaction retardants.

Component (g) may also be added in preparing the composition or at a stage where a coating layer is formed or at both the stages of the preparation of the composition and the formation of the coating layer.

The amount of component (g) used is usually from 0 to 10 molest preferably from 0.001 to 5 moles, and more preferably from 0.001 to 2 moles, based on mole of $OR^2$ contained in the above-mentioned component (a) and component (b), for the compounds other than the organometallic compounds, etc. In the case of the organometallic compounds, etc., the amount of component (g) used is usually from 0 to 10 moles, preferably from 0.001 to 7 moles, and more preferably from 0.001 to 5 moles, based on mole of $OR^2$ contained in component (a) and component (b) In this case, when the amount of component (g) used exceeds 10 moles, the composition tends to deteriorate in storage stability, and cracks are liable to be developed in the resultant coating layer.

Component (h):

Component (h) is at least one selected from the group consisting of a β-diketone and/or a β-keto ester represented by the following general formula, a carboxylic acid compound, a dihydroxy compound, an amine compound and an oxyaldehyde compound.

$R^6COCH_2COR^7$ wherein, $R^6$ and $R^7$ each have the same meanings as given for $R^6$ and $R^7$ of the above-mentioned general formula in organometallic compound (4).

Such Component (h) is preferably used in combination, particularly when the organometallic compound, etc. is used as the above-mentioned component (g).

Component (h) serves as a stability enhancing agent for the composition. That is to say, it is presumed that component (h) coordinates to a metallic atom in the organometallic compounds etc. to appropriately control the action for promoting the co-condensation reaction of the above-mentioned components (a), (b) and (c) according to the organometallic compound, etc., thereby acting so as to further improve the storage stability of the resultant composition.

Specific examples of component (h) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, hexane-2,4-dione, heptane-2,4-dione, heptane-3,5-dione, octane-2,4-dione, nonane-2,4-dione, 5-methylhexane-2,4-dione, malonic acid, oxalic acid, phthalic acid, glycolic acid, salicylic acid, aminoacetic acid, iminoacetic acid, ethylenediamine-tetraacetic acid, glycol, catechol, ethylenediamine, 2,2-bipyridine, 1,10-phenanthroline, diethylenetriamine, 2-ethanolamine, dimethylglyoxime, dithizone, methionine and salicylaldehyde. Of these, preferred are acetylacetone and ethyl acetoacetate.

Components (h) can be used either alone or as a mixture of two or more of them.

The amount of component (h) used is usually 1 mole or more, and preferably from 2 to 20 moles, based on mole of the organometallic compound in the above-mentioned organometallic compound, etc. In this case, when the amount of component (h) used is less than 2 moles, the effect of improving the storage stability of the resultant composition becomes insufficient in some cases.

Component (j):

Component (j) is a powder and/or a sol or a colloid of an inorganic compound, and mixed according to the desired properties of the coating layer, with the proviso that colloidal silica and colloidal alumina, the above-mentioned components (f), are extruded from component (j) in the composition of the present invention.

When component (j) is in the sol or colloid form, the average particle size thereof is usually from about 0.001 to about 100 µm.

Specific examples of the compounds constituting component (j) include AlGaAs, $Al(OH)_3$, $Sb_2O_5$, $Si_3N_4$, $Sn-In_2O_3$, $Sb-In_2O_3$, MgF, $CeF_3$, $CeO_2$, $3Al_2O_3 \cdot 2SiO_2$, BeO, SiC, AlN, Fe, Co, $Co-FeO_x$, $CrO_2$, $Fe_4N$, $BaTiO_3$, $BaO-Al_2O_3-SiO_2$, Ba ferrite, $SmCO_5$, $YCO_5$, $CeCO_5$, $PrCO_5$, $Sm_2CO_{17}$, $Nd_2Fe_{14}B$, $Al_4O_3$, α-Si, $SiN_4$, CoO, $Sb-SnO_2$, $Sb_2O_5$, $MnO_2$, MnB, $Co_3O_4$, $Co_3B$, $LiTaO_3$, MgO, $MgAl_2O_4$, $BeAl_2O_4$, $ZrSiO_4$, ZnSb, PbTe, GeSi, $FeSi_2$, $CrSi_2$, $CoSi_2$, $MnSi_{1.73}$, $Mg_2Si$, β-B, BaC, BP, $TiB_2$, $ZrB_2$, $HfB_2$, $Ru_2Si_3$, $TiO_2$ (rutile), $TiO_3$, $PbTiO_3$, $Al_2TiO_5$, $ZnO_2$, $Zn_2SiO_4$, $Zr_2SiO_4$, $2MgO-Al_2O_3 \cdot 5SiO_2$, $Nb_2O_5$, $Li_2O-Al_2O_3 \cdot 4SiO_2$, Mg ferrite, Ni ferrite, Ni—Zn ferrite, Li ferrite and Sr ferrite.

These components (j) can be used either alone or as a mixture of two or more of them.

As the existing forms of component (j), there are a powder, an aqueous sol or colloid in which component (j) is dispersed in water, and a solvent sol or colloid in which component (j) is dispersed in a polar solvent such as isopropyl alcohol or a nonpolar solvent such as toluene. The solvent sol or colloid may be further diluted with water or a solvent for use depending on the dispersion stability of the semiconductor, or component (j) may be surface treated for improving the dispersion stability.

When component (i) is in the aqueous sol or colloid form, or in the solvent sol or colloid form, the solid concentration is preferably 40% by weight or less.

In particular, when the undercoating composition described later is prepared, addition of component (j) having ultraviolet absorbing ability (for example, $CeO_2$ or $ZnO_2$) can inhibit deterioration of the substrate caused by ultraviolet rays.

Commercially available products of components (i) having ultraviolet absorbing ability include TIPAQUE TTO manufactured by Ishihara Sangyo Kaisha, Ltd., ZW-143, ZW-513C, ZS-300, ZS-303, ZnO-100 and ZnO-200 manufactured by Sumitomo Osaka Cement Co., Ltd., Z-NOUVE manufactured by Mitsui Mining & Smelting Co., Ltd., NEEDRAL manufactured by Taki Chemical Co., Ltd., and CERIGUARD and HIGH-CERA SUPER K-29 manufactured by Nippon Inorganic Colour & Chemical Co., Ltd.

As a method for adding component (j) to the composition, component (j) may be added after the preparation of the composition or may be added in preparing the composition to allow component (j) to be co-hydrolyzed and co-condensed with the above-mentioned components (a), (b) and (e).

The amount of component (j) used is generally from 0 to 500 parts by weight, and preferably from 0.1 to 400 parts by weight, in terms of the solid content, based on 100 parts by weight of the complete hydrolyzates/condensates of the above-mentioned components (a), (b) and (e).

Other Additives:

Appropriate fillers may be separately added to and dispersed in the coating compositions of the present invention for coloring and increasing the thickness of the resultant coating layers.

Such fillers includes for example, water-insoluble organic and inorganic pigments, granular, fibrous or scaly ceramics, metals and alloys, oxides, hydroxides, carbides, and nitrides and sulfides of these metals.

Specific examples of the above-mentioned fillers include iron, copper, aluminum, nickel, silver, zinc, ferrite, carbon black, stainless steel, silicon dioxide, titanium dioxide for pigment, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine, Prussian blue, pigment green, rocky blue, cobalt blue, cerulean blue, copper borate, molybdenum blue, copper sulfide, cobalt purple, mars violet, manganese purple, pigment violet, lead suboxide, calcium plumbate, zinc yellow, lead sulfide, chrome yellow, yellow soil, cadmium yellow, strontium yellow, titanium yellow, litharge, pigment yellow, copper suboxide, cadmium red, selenium red, chrome vermilion, Indian red, zinc white, antimony white, basic lead sulfate, titanium white, lithopone, lead silicate, zirconium oxide, tungsten white, lead, zinc white, Bantison white, lead phthalate, manganese white, lead sulfate, graphite, bone black, diamond black, Thermatomic black, plant black, potassium titanate whisker and molybdenum disulfide.

These fillers can be used either alone or as a mixture of two or more of them

The amount of the filler used is usually 300 parts by weight or less, based on 100 parts by weight of the total solid content of the composition.

Further, the compositions of the invention can also contain other additives such as surfactants, silane coupling agents, titanium coupling agents and dyes, as well as known dehydrating agents such as methyl orthoformate, methyl orthoacetate and tetraethoxysilane; dispersing agents such as poly(oxyethylene alkyl ethers), poly(oxyethylene alkyl phenyl ethers), poly(oxyethylene esters of fatty aids), polycarboxylic acid) polymer surfactants, polycarboxylates, polyphosphates, polyacrylates, polyamide esters and polyethylene glycol; thickening agents including cellulose derivatives such as methyl cellulose, ethyl cellulose, hydroxyethyl cellulose, hydroxypropyl cellulose and hydroxypropylmethyl cellulose, castor oil derivatives and ferrosilicates; inorganic foaming agents such as ammonium carbonate, ammonium bicarbonate, ammonium nitrite, sodium boron hydride and calcium amide, and organic foaming agents including azo compounds such as azobisisobutyronitrile, hydrazine compounds such as diphenylsulfone-3,3-disulfohydrazine, semicarbazide compounds, triazole compounds and N-nitroso compounds, as desired.

Further, leveling agents can be added for more improving the coating performance of the coating compositions. Of such leveling agents, fluorine leveling agents include, for example, BM1000 and BE1100 manufactured by BM-Chemie, EFCA 772 and EFCA 777 manufactured by Efca Chemicals, a FLORENE series manufactured by Kyoeisha Kagaku Co., an FC series of SUMITOMO 3M LIMITED and a FLUONAL TF series of Toho Chemical Industry Co., Ltd. Further, silicone leveling agents include, for example, a BYK series manufactured by SYK Chemie, a Sshmego series of Sshmegmann and Efca 30, Efca 31, Efca 34, Efca 39, Efca 83, Efca 86 and Efca 88 manufactured by Efca Chemicals. Ether or ester leveling agents include, for example, Carphynol of Nisshin Kagaku Kogyo Co., Ltd. and EMARGEN and HOMOGENOL manufactured by KAO CORPORATION.

Compounding of such leveling agents improves the finished appearance of coating layers and allows uniform coating also in the formation of thin films.

The amount of the leveling agent used is preferably from 0.01 to 5% by weight, and more preferably from 0.02 to 3% by weight, based on the whole composition.

As a method for adding the leveling agent, it may also be added in preparing the composition or at a stage where a coating layer is formed or at both the stages of the preparation of the composition and the formation of the coating layer.

In preparing the composition of the present invention, when component (g) and component (h) are not used, there is no particular limitation on the method for mixing each component. However, when component (g) and component (h) are used, a method is preferably employed in which a mixture of components excluding Component (h) from components (a) to (j) is obtained, followed by addition of component (h) thereto.

Method for Producing Composition

As a method for producing the composition of the present invention, it is preferable to hydrolyze and condense at least one selected from the group consisting of components (a), (b) and (e), preferably all of components (a), (b) and (e) in the presence of (c') an aqueous dispersion of a photocatalyst having a pH of 3 to 9 and (d') an organic solvent in which the content of an organic solvent having a surface tension at 20° C. of more than 260 $\mu$N/cm is 20% by weight or less based on the whole organic, solvent.

The use of an aqueous dispersion of a photocatalyst having a pH of 3 to 9 as component (c) results in reduced corrosiveness to a machine used in the production or coating of the resultant composition.

Further, when (d') an organic solvent in which the content of an organic solvent having a surface tension at 20° C. of more than 260 $\mu$N/cm is 20% by weight or less is used as organic solvent (d), the surface tension of the whole organic solvent becomes 260 $\mu$N/cm or less. As a result, the wettability of the resultant composition to a substrate is improved, resulting in excellent film-forming properties thereof on the substrate.

Further, as a method for producing the composition of the present invention, it is particularly preferred that component (a) is first hydrolyzed and condensed in the presence of the above-mentioned component (c'). This operation causes co-condensation of photocatalyst (c) with organosilane (l), resulting in good compatibility with component (b) component (e) originally poor in compatibility with an aqueous dispersion of a photocatalyst and an organic solvent having a surface tension of 260 $\mu$N/cm or less, component (d-1). Consequently, the hydrolysis/condensation of component (a), component (b) and component (e) become possible in the presence of component (c) and component (d'), As a result, the dispersion stability in an organic solvent low in surface tension such as an alcohol relatively high in hydrophobicity (for example, i-propyl alcohol or i-butyl alcohol) is improved, the storage stability of the resultant composition becomes better, the cissing phenomenon does not occur on an undercoating layer and a substrate, and the film-forming properties are improved.

Specific examples of the methods for producing the composition of the present invention include a method of adding all or a part of component (a) to component (c) hydrolyzing and condensing component (a) utilizing water in component (c), then, adding components (b), (e) and (d), and the remainder of component (a) as so desired, followed by mixing, and further conducting the condensation reaction; and a method of subjecting all or a part of component (a) to the hydrolysis/condensation reaction in the presence of component (c), then, sequentially adding the remainder of component (a) as so desired, and components (b), (e) and (d), followed by mixing, and conducting the condensation reaction.

The total solid concentration of the composition of the present invention is generally from 3 to 50% by weight, and preferably from 5 to 40% by weight. When the total solid concentration of the composition exceeds 45% by weight, the storage stability is lowered in some cases. The composition of the present invention is usually appropriately adjusted according to its application purpose at the time of coating.

Undercoating Composition

As described above, the compositions of the present invention provide the coating layers excellent in resistance to stains, coating layer durability and transparency and having photocatalytic activity. However, for preventing deterioration of substrates caused by photocatalysts and further obtaining coating substrates also excellent in long-term durable adhesion, it is desirable to undercoat the following undercoating compositions (i) to (iv) on the substrates.

Composition (i):

Composition (i) is an undercoating composition containing the above-mentioned component (a) and component (e) (hereinafter also referred to as "undercoating composition (i)" or "composition (i)").

Composition (ii):

Composition (ii) is an undercoating composition containing the above-mentioned component (a), component (e) and component (f) (hereinafter also referred to as "undercoating composition (ii)" or "composition (ii)").

Composition (iii):

Composition (iii) is an undercoating composition containing the above-mentioned component (a), component (e) and at least one of colloidal cerium oxide and colloidal zinc oxide having ultraviolet absorbing ability as component (j) hereinafter also referred to as "undercoating composition (iii)" or "composition (iii)").

Composition (iv):

Composition (iv) is an undercoating composition containing the above-mentioned component (a), component (e), component (f) and at least one of colloidal cerium oxide and colloidal zinc oxide having ultraviolet absorbing ability as component (j) (hereinafter also referred to as "undercoating composition (iv)" or "composition (iv)").

In compositions (i) to (iv), the above-mentioned component (a) and component (e) are preferably co-condensed in the presence of water and/or an organic solvent. In this case, the amount of water used is usually 0.1 mole or more, and preferably from about 0.2 to about 2 moles, based on mole of $OR^2$ in organosilane (1) and component (e).

Components (i) to (iv) are usually supplied in the form of a solution or dispersion in water and/or an organic solvent. There is no particular limitation on the organic solvent, as long as it can mix each component homogeneously, Examples of the solvents include alcohols, aromatic hydrocarbons, ethers, ketones and esters.

Of these organic solvents, specific examples of the alcohols include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate and diacetone alcohol.

Further, specific examples of the aromatic hydrocarbons include benzene, toluene and xylene; specific examples of the ethers include tetrahydrofuran and dioxane; specific examples of the ketones include acetone, methyl ethyl ketone, methyl isobutyl ketone and diisobutyl ketone; and specific examples of the esters include ethyl acetate, propyl acetate, butyl acetate and propylene carbonate.

These organic solvents can be used either alone or as a mixture of two or more of them.

Components (i) to (iv) can each further contain the above-mentioned components (g) to (j) as required.

Furthermore, for improving weather resistance and long-term durable adhesion, components (i) to (iv) may contain addition type ultraviolet absorbers and/or ultraviolet stabilizers, the above-mentioned fillers, other additives which can be added to the compositions of the present invention, and leveling agents.

Other resins may be blended with compositions (i) to (iv). The other resins include acrylic-urethane resins, epoxy resins, polyester resins, acrylic resins, fluororesins, acrylic resin emulsions, epoxy resin emulsions, polyurethane emulsions and polyester emulsions.

The total solid concentration of the above-mentioned undercoating compositions (i) to (iv) is usually 50% by weight or less, and preferably 40% by weight or less. It is appropriately adjusted according to the kind of substrate, the coating method and the coating layer thickness.

Cured Product

The cured product obtained by use of the composition of the present invention has, for example, the following structure:

(1) Substrate/coating composition;
(2) Substrate/undercoating compositions (i) to (iv)/coating composition:
(3) substrate/primer/coating composition; or
(4) Substrate/primer/undercoating compositions (i) to (iv)/coating composition.

Coating film

The coating film of the present invention has a dry coating layer comprising the undercoating composition of any one of (i) to (iv) described above, and has thereon a dry coating layer comprising the coating composition of the present invention.

The coating film of the present invention can be obtained by coating a substrate with the undercoating composition, followed by curing, and applying the coating composition of the present invention thereon, followed by curing.

Means used for coating the substrate with any one of the compositions of the present invention include a brush, a roll coater, a flow coater, a centrifugal coater, an ultrasonic coater, a (micro)gravure coater, dip coating, flow coating, spray coating, a screen process, electrodeposition and vapor deposition.

In the case of the compositions of the present invention, coating layers having a thickness of about 0.05 to about 20 µm in one application of a thickness of about 0.1 to about 40 µm in two applications, in dry thickness, can be formed. Then, the compositions applied onto the substrates are dried at room temperature, or heated at a temperature of about 30° C. to about 200° C. for about 1 to 60 minutes to dry them. Thus, the coating layers can be formed.

When the undercoating is preliminarily applied, the above-mentioned compositions (i) to (iv) are preferably used. As coating methods of compositions (i) to (iv), there can be used the above-mentioned methods for coating the substrates with the compositions of the present invention. Coating layers having a thickness of from about 0.05 to about 40 µm in one application or a thickness of from about 0.1 to about 80 µm in two or three applications, in dry thickness, can be formed. Then, the coating layers are dried at ordinary temperature, or dried by heating at about 30 to about 200° C. usually for about 0.5 to about 60 minutes, thereby being able to form coating layers on various substrates.

The total thickness of the undercoat layer and the overcoat layer is usually from about 0.1 to about 80 µm, and preferably from about 0.2 to about 60 µm, in dried thickness.

Substrate

Materials for the substrates to which the compositions of the present invention are applicable include, for example, metals such as iron, aluminum and stainless steel; inorganic ceramic materials such as cement, concrete, ALC(foamed concrete), flexible boards, mortar, slate, gypsum, ceramics and brick; shaped articles of plastics such as phenol resins, epoxy resins, polymethyl(meth)acrylate (PMMA), polyesters, polycarbonates (PC) polyethylene, polypropylene and ABS resins (acrylonitrile-butadiene-styrene resins); films of plastics such as acrylic resin, polyethylene, polypropylene, polyvinyl alcohol, polycarbonates, polyethylene terephthalate (PET), polyurethanes and polyimides: wood; paper; and glass. The compositions of the present invention are also useful for repainting of deteriorated coating layers.

The substrates can also be preliminarily surface treated for base preparation, improvement in adhesion, sealing of porous substrates, smoothing and patterning The surface treatments to the metallic substrates include, for example, polishing, degreasing, plating treatment, chromate treatment, flame treatment and coupling treatment. The surface treatments to the plastic substrates include, for example, blast treatment, treatment with chemicals, degreasing, flame treatment, oxidation treatments vapor treatment, corona discharge treatment, ultraviolet irradiation treatment, plasma treatment and ion treatment. Further, the surface treatments to the inorganic ceramic substrates include, for example, polishing, sealing and patterning. Still further, the surface treatments to the wood substrates include, for example, polishing, sealing and insect proofing treatment. Furthermore, the surface treatments to the paper substrates include, for examples sealing and insect proofing treatment. The surface treatments to the deteriorated coating layers include, for example, polishing.

The coating operation of the composition of the present invention varies depending on the kind and state of substrate and the coating method. For example, in the case of the metallic substrates, primers are used in addition to undercoating compositions (i) to (iv), if rust prevention is required. In the case of the inorganic ceramic substrates, the covering properties of the coating layers vary depending on the characteristics (such as surface roughness, impregnation properties and alkalinity) of the substrates, so that primers are employed in some cases. Further, in repainting deteriorated coating layers, when the deterioration of the old coating layers is significant, primers are used.

In the case of other substrates such as plastics, wood, paper and glass, primers may be used or not, depending on their application.

There is no particular limitation on the kind of primer, as long as it has the function of enhancing the adhesion between the substrate and the composition, and it is selected depending on the kind and application purpose of substrate. The primers can be used either alone or as a mixture of two or more of them. They may be either enamel containing coloring components, or clear one containing no coloring components.

Examples of the primers include alkyd resins, aminoalkyd resins, epoxy resins, polyesters, acrylic resins, urethane resins, fluororesins, acrylic silicone resins, acrylic resin emulsions, epoxy resin emulsions, polyurethane emulsions and polyester emulsions. When the adhesion is required between the substrates and the coating layers under severe conditions, various functional groups can also be imparted to these primers. Such functional groups include, for example, a hydroxyl group, a carboxyl group, a carbonyl group, an amido group, an amine group, a glycidyl group, an alkoxysilyl group, an ether bond and an ester bond. The primers may also contain ultraviolet ray absorbers and ultraviolet ray stabilizers.

For the purpose of increasing the abrasion resistance and the glossiness of the coating layers, clear layers composed of, for example, siloxane resin paints such as stable dispersions of colloidal silica and siloxane resins disclosed in U.S. Pat. Nos. 3,986,997 and 4,027,073 can also be formed on surfaces of the coating layers formed of the compositions of the present invention.

According to the present invention, there can be provided the coating composition excellent in dispersion stability of a photocatalyst even in a highly hydrophobic alcohol, excellent in storage stability of the resultant composition, giving a coating layer excellent in durability and adhesion, and having a photocatalytic function. Accordingly, coating of exterior materials, road materials, interior materials, fibers and so on with the coating compositions of the present invention can from coating layers high in hardness and excellent in weather resistance, coating layer durability, resistance to alkalis, resistance to organic chemicals and resistance to stains.

The invention will be illustrated with reference to examples in more detail below, but the following examples are not intended to limit the scope of the invention. Parts and percentages in the examples and comparative examples are on a weight basis, unless otherwise specified. Various measurements and evaluations in the examples and comparative examples were made as follows:

(1) Mw

The Mw was Measured by gel permeation chromatography (GPC) according to the following conditions:

Sample: A sample was prepared by dissolving 1 g of an organosilane hydrolyzate/condensate or 0.1 g of a silyl group-containing polymer to be measured in 100 cc of tetrahydrofuran.

Standard polystyrene: Standard polystyrene manufactured by Pressure Chemical Co., Ltd., USA was used.

Apparatus: High temperature and high speed gel permeation chromatogram (model 150-C ALC/GPC, manufactured by Waters Co., Ltd., USA);

Column: SHODEX A-8M (50 cm in length) manufactured by Showa Denko K.K.;

Measuring temperature: 40° C.;

Flow rate: 1 cc/minute.

(2) Storage Stability

A composition having a solid concentration of about 30% before after-dilution was stored in a polyethylene bottle in the sealed state at ordinary temperature for 1 month, and the presence or absence of gelation was visually judged. For the composition in which no gelation occurred, the viscosity was measured with a BM type viscometer manufactured by Tokimec Co., Ltd. When the rate of change thereof was within 20%, it was indicated as ○ (no change).

On the other hand, a composition having a solid concentration of about 10% after after-dilution to which no curing accelerator was added was stored in a polyethylene bottle in the sealed state at ordinary temperature for 3 months, and the presence or absence of gelation was visually judged. For the composition in which no gelation occurred, the viscosity was measured with a BM type viscometer manufactured by Tokimec Co., Ltd. When the rate of change thereof was within 20%, it was indicated as ○ (no change).

(3) Hardness

The hardness was measured based on the pencil hardness according to JIS K5400.

(4) Resistance to Alkalis

After a test piece was immersed in a saturated aqueous solution of calcium hydroxide for 60 days, the state of a coating layer was visually observed.

(5) Resistance to Organic Chemicals

Isopropyl alcohol was dropped in an amount of 2 cc onto a coating layer, and wiped off with cloth after 5 minutes. Then, the state of the coating layer was visually observed.

(6) Resistance to Moisture

A test piece was continuously kept under the circumstances of 50° C. (temperature) and 95% (moisture) for 1,000 hours. Then, the test piece was taken out, and the state of a coating layer was visually observed.

(7) Resistance to Weather

A 2,000-hour irradiation test was carried out with a Sunshine weather meter according to JIS K5400, and the state of appearance (cracking, peeling and so forth) of a coating layer was visually observed.

(8) Resistance to Water

After a test piece was immersed in tap water at room temperature for 60 days, the state of a coating layer was visually observed.

(9) Resistance to Stains

A paste composed of a mixture of carbon black/kerosine oil=½ (in weight ratio) was applied onto a coating layer, and allowed to stand at room temperature for 24 hours, followed by washing with water using a sponge. The stained state of a coating layer was visually observed, and evaluated on the basis of the following criteria:

○: Not stained
Δ: Slightly stained
x: Terribly stained.

(10) Transparency

Each composition was applied onto quartz glass so as to give a dry thickness of 1 μm. Then, the transparency of visible light was measured, and evaluated on the basis of the following criteria:

⊚: The permeability exceeded 80%.
o: The permeability was from 60% to 80%.
Δ: The permeability was less than 60%.

(11) Hydrophilicity

After a coating layer was irradiated with a black-light fluorescent lamp for 72 hours, the contact angle (unit: degree) of water was measured.

(12) Adhesion

A tape peeling test was conducted three times by the cross-cut adhesion test (100 cross cuts) according to JIS K5400, and adhesion was based on an average thereof.

EXAMPLE 1

In a reaction vessel equipped with a stirrer and a reflux condenser, 165 parts of anatase type titanium oxide dispersed in water having a solid concentration of 24.5%, a pH of 3 and an average particle size of 50 nm as component (c) and 21 parts of methyltrimethoxysilane as component (a) were placed, followed by stirring at 30° C. for 1 hour. Then, 39 parts of methyltrimethoxysilane and 7 parts of γ-glycidoxypropyltrimethoxysilane as component (a), 15 parts of an end alkoxysilyl group/poly(oxyethylene/oxypropylene) group-containing oligomer (Mw: 10,000) as component (b) and 32 parts of i-propyl alcohol(surface tension at 20° C.: 217.0 μN/cm) as component (d-1) were added and mixed, followed by stirring at 30° C. for 1 hour. Then, 3 parts of ethylacetoacetate-aluminum-di-i-propylate as component (g) dissolved in 15 parts of i-propyl alcohol as component (d-1) was added and mixed, followed by co-condensation reaction at 60° C. for 4 hours with stirring. Thereafter, 4 parts of acetylacetone was added as component (h), and stirred for 1 hour, followed by cooling to room temperature. Then, 600 parts of i-propyl alcohol was added as component (d-1) to obtain composition I-1 having a solid concentration of about 10%. Components of the composition prepared are shown in Table 1.

EXAMPLES 2 to 6

Compositions I-2 to I-6 were prepared in the same manner as with Example 1 with the exception that respective components shown in Table 1 were used. When colloidal silica dispersed in methanol (solid concentration: 10%), component (f), was added as an additional component, it was added after cooling to room temperature and addition of the diluent. Of the organic solvents shown in Table 1, ethylene glycol monobutyl ether has a surface tension (20° C.) of 274 μN/cm, and diethylene glycol monoethyl ether has a surface tension (20° C.) of 318 μN/cm.

TABLE 1

|  | Example | | | | | |
|---|---|---|---|---|---|---|
|  | 1 | 2 | 3 | 4 | 5 | 6 |
| Name of Composition | I-1 | I-2 | I-3 | I-4 | I-5 | I-6 |
| Mixing Component (parts) | | | | | | |
| In Mixing at Room Temp. (1) | | | | | | |
| Component (a): Methyltri-methoxysilane | 21 | 18 | 18 | 18 | 16 | 16 |
| Component (c): Aqueous Dispersion of Titanium Oxide (solid conc.: 24.5%) | 165 | 147 | 147 | 147 | 129 | 129 |

TABLE 1-continued

|  | Example | | | | | |
|---|---|---|---|---|---|---|
|  | 1 | 2 | 3 | 4 | 5 | 6 |
| In Mixing at Room Temp. (2) | | | | | | |
| Component (a): | | | | | | |
| Methyltrimethoxysilane | 39 | 47 | 47 | 47 | 67 | 67 |
| γ-Glycidoxypropyltri-methoxysilane | 7 | 8 | 8 | 0 | 0 | 0 |
| Dimethyldimethoxysilane | 0 | 0 | 0 | 9 | 0 | 0 |
| Component (b): | | | | | | |
| End alkoxysilyl group-containing trifunctional siloxane oligomer (Mw = 1,000) | 0 | 0 | 16 | 0 | 0 | 17 |
| End alkoxysilyl group/poly(oxyethylene/oxypropylene) group-containing dimethylsiloxane oligomer (Mw 10,000) | 15 | 16 | 0 | 16 | 17 | 0 |
| Component (d-1): i-Propyl Alcohol | 32 | 42 | 42 | 41 | 48 | 48 |
| In Condensation Reaction | | | | | | |
| Component (g): Ethylacetoacetate-aluminum-di-i-propylate | 3 | 3 | 3 | 3 | 4 | 4 |
| Component (d-1): i-Propyl Alcohol | 15 | 16 | 16 | 16 | 18 | 18 |
| After-Addition Component | | | | | | |
| Component (h): Acetylacetone | 4 | 0 | 0 | 5 | 5 | 5 |
| Component (d-1): i-Propyl Alcohol | 600 | 600 | 550 | 550 | 600 | 600 |
| Component (d-2): | | | | | | |
| Ethylene Glycol Monobutyl Ether | 0 | 0 | 50 | 0 | 0 | 0 |
| Diethylene Glycol Monoethyl Ether | 0 | 0 | 0 | 50 | 0 | 0 |
| Additional Component Component (f): Colloidal Silica (dispersion in methanol 10%) | 0 | 0 | 0 | 0 | 0 | 200 |

Reference Example 1

Synthesis of Component (e) Used in Undercoating Composition

In a reaction vessel equipped with a stirrer and a reflux condenser, 55 parts of methyl methacrylate, 5 parts of 2-ethylhexyl acrylate, 5 parts of cyclohexyl methacrylate, 10 parts of γ-methacryloxypropyltrimethoxysilane, 20 parts of glycidyl methacrylate 5 parts of 4-(meth)acryloyloxy-2,2,6,6-tetramethylpiperidine, 75 parts of i-butyl alcohol, 50 parts of methyl ethyl ketone and 25 parts of methanol were placed and mixed. Then, the mixture was heated to 80° C. with stirring, and a solution of 3 parts of azobisisovaleronitrile in 8 parts of xylene was added dropwise to the mixture for 30 minutes, followed by reaction at 80° C. for 5 hours. Thus, a polymer solution having a solid concentration of 40% (hereinafter referred to as "(E-1)") was obtained, the polymer having an Mw of 12,000.

Reference Example 2

Synthesis of Component (e) Used in Undercoating Composition

In a reaction vessel equipped with a stirrer and a reflux condenser, 55 parts of methyl methacrylate, 5 parts of 2-ethylhexyl acrylate, 5 parts of cyclohexyl methacrylate, 10 parts of γ-methacryloxypropyltrimethoxysilane, 20 parts of 2-hydroxyethyl methacrylate, 5 parts of 4-(meth)-acryloyloxy-2,2,6,6-tetramethylpiperidine, 75 parts of i-butyl alcohol, 50 parts of methyl ethyl ketone and 25 parts of methanol were placed and mixed. Then, the mixture was heated to 80° C. with stirring, and a solution of 3 parts of azobisisovaleronitrile in 8 parts of xylene was added dropwise to the mixture for 30 minutes, followed by reaction at 80° C. for 5 hours. Thus, a polymer solution having a solid concentration of 40% (hereinafter referred to as "(E-2)") was obtained, the polymer having an Mw of 13,000.

Reference Example 3

Synthesis of Component (e) Used in Undercoating Composition

In a reaction vessel equipped with a stirrer and a reflux condenser, 30 parts of methyl methacrylate, 5 parts of 2-ethylhexyl acrylate, 10 parts of γ-methacryloxypropyltrimethoxysilane, 20 parts of glycidyl methacrylate, 5 parts of 4- meth)acryloyloxy-2,2,6,6-tetramethylpiperidine, 30 parts of 2-(2'-hydroxy-5-methacryloxyethylphenyl)-2H-benzotriazole, 75 parts of i-butyl alcohol, 50 parts of methyl ethyl ketone and 25 parts of methanol were placed and mixed. Then, the mixture was heated to 80° C. with stirring, and a solution of 4 parts of azobisisovaleronitrile in 10 parts of xylene was added dropwise to the mixture for 30 minutes, followed by reaction at 80° C. for 5 hours. Then, 83 parts of methyl ethyl ketone was added to obtain a polymer solution having a solid concentration of 30% (hereinafter referred to as "(E-3)"), the polymer having an Mw of 10,000.

Preparation Example 1

Preparation of Undercoating Composition

In a reaction vessel equipped with a stirrer and a reflux condenser, 71 parts of methyltrimethoxysilane and 24 parts of dimethyldimethoxysilane as component (a), 125 parts of (E-1) having a solid concentration of 40%, 34 parts of i-propyl alcohol and 15 parts of methyl ethyl ketone as component (e), and 3 parts of ethylacetoacetate-aluminum-di-i-propylate as component (g) were placed and mixed. The temperature of the mixture was elevated to 50° C. with stirring. Then, 17 parts of water was continuously added for 30 minutes, followed by reaction at 60° C. for 4 hours. Then, 4 parts of acetylacetone was added as component (h), and stirred for 1 hour, followed by cooling to room temperature. Thereafter, 190 parts of methyl ethyl ketone, 75 parts of butyl acetate, 20 parts of ethylene glycol monobutyl ether and 95 parts of isopropyl alcohol were added with stirring to obtain undercoating composition (i-1). Respective components of the composition thus prepared are shown in Table 2.

Preparation Examples 2 to 13

Preparation of Undercoating Compositions

Undercoating compositions (i-2) to (i-6) were obtained in the same manner as with Preparation Example 1 with the exception that respective components shown in Table 2 were used. When colloidal silica dispersed in isopropyl alcohol (solid concentration: 15%) or CeO$_2$ dispersed in isobutyl alcohol was added as another additive, it was added after cooling to room temperature and addition of the diluting solvent.

TABLE 2

| | Preparation Example | | | | | |
|---|---|---|---|---|---|---|
| | 1 | 2 | 3 | 4 | 5 | 6 |
| Name of Composition | i-1 | i-2 | i-3 | i-4 | i-5 | i-6 |
| Mixing Component (parts) | | | | | | |
| Component (a): | | | | | | |
| Methyltrimethoxysilane | 71 | 71 | 41 | 51 | 41 | 41 |
| Dimethyldimethoxysilane | 24 | 24 | 16 | 0 | 16 | 16 |
| Component (b): | 0 | 0 | 0 | 25 | 0 | 0 |
| End alkoxysilyl group-containing siloxane oligomer (Mw = 3,000) | | | | | | |
| Component (e): | | | | | | |
| (E-1) solid conc.: 40% | 125 | 0 | 0 | 125 | 175 | 175 |
| (E-2) solid conc.: 40% | 0 | 125 | 0 | 0 | 0 | 0 |
| (E-3) solid conc.: 30% | 0 | 0 | 233 | 0 | 0 | 0 |
| Added in Reaction | | | | | | |
| Water | 17 | 17 | 17 | 10 | 10 | 10 |
| Methyl Isobutyl Ketone | 0 | 0 | 0 | 0 | 0 | 0 |
| Methyl Ethyl Ketone | 15 | 15 | 0 | 37 | 13 | 13 |
| i-Propyl Alcohol | 34 | 34 | 0 | 37 | 31 | 31 |
| Added after Completion of Reaction and Cooling | | | | | | |
| Methyl Isobutyl Ketone | 0 | 0 | 100 | 80 | 0 | 0 |
| Methyl Ethyl Ketone | 190 | 190 | 188 | 200 | 190 | 190 |
| Butyl Acetate | 75 | 75 | 0 | 0 | 75 | 95 |
| Ethylene Glycol Monobutyl Ether | 20 | 20 | 34 | 20 | 20 | 0 |
| i-Propyl Alcohol | 95 | 95 | 0 | 82 | 95 | 95 |
| Component (g): Ethyl-acetoacetate-aluminum-di-i-propylate | 3 | 3 | 5 | 3 | 3 | 3 |
| After-Addition Component | | | | | | |
| Component (h): Acetylacetone | 4 | 4 | 6 | 4 | 4 | 4 |
| Additional Component | | | | | | |
| Component (f): Colloidal Silica Dispersed in i-Propyl Alcohol (solid conc.: 15%) | 0 | 200 | 0 | 0 | 200 | 0 |
| Component (j): CeO$_2$ Dispersed in i-Butyl Alcohol (solid conc.: 15%) | 0 | 0 | 0 | 0 | 0 | 200 |

EXAMPLES 7 to 12

To 100 parts of each coating composition of the present invention, 3 parts of a solution of a reaction product of dibutyl tin diacetate and silicate oligomer in i-propyl alcohol (solid concentration: 15%) was added and sufficiently stirred. The resultant composition was applied onto quartz glass and dried so as to give a dry thickness of 0.2 μm to obtain a cured product. For each cured product thus obtained, various evaluations were carried out. Results thereof are shown in Table 3.

TABLE 3

| | Example | | | | | |
|---|---|---|---|---|---|---|
| | 7 | 8 | 9 | 10 | 11 | 12 |
| Composition of the Invention | I-1 | I-2 | I-3 | I-4 | I-5 | I-6 |
| Storage Stability (solid conc. 10%) | ○ | ○ | ○ | ○ | ○ | ○ |
| Pencil Hardness | 5 H | 5 H | 5 H | 5 H | 5 H | 5 H |
| Resistance to Alkalis | Good | Good | Good | Good | Good | Good |

TABLE 3-continued

|  | Example | | | | | |
|---|---|---|---|---|---|---|
|  | 7 | 8 | 9 | 10 | 11 | 12 |
| Resistance to organic chemicals | Good | Good | Good | Good | Good | Good |
| Resistance to Moisture | Good | Good | Good | Good | Good | Good |
| Resistance to Weather | Good | Good | Good | Good | Good | Good |
| Resistance to Water | Good | Good | Good | Good | Good | Good |
| Resistance to Stains | ⊚ | ⊚ | ⊚ | ⊚ | ⊚ | ⊚ |
| Transparency | ○ | ○ | ○ | ○ | ○ | ○ |
| Hydrophilicyty (degree) | 4 | 3 | 3 | 3 | 4 | 3 |

EXAMPLES 13 to 46

To 100 parts of each of undercoating Compositions (i-1), (i-2) and (i-4) to (i-6), 10 parts of a solution of dioctyl tin dimaleate ester in i-propyl alcohol (solid concentration: 15%) was added, followed by sufficient stirring. The resultant composition was applied onto each substrate shown in Tables 4 to 6, and dried so as to give a dry thickness of 2 μm. Then, a composition obtained by adding 3 parts of a solution of a reaction product of dibutyl tin diacetate and silicate oligomer in i-propyl alcohol (solid concentration 15%) to 100 parts of each of the coating compositions of the present invention and sufficiently stirring the resultant mixture was applied thereon and dried so as to give a coating layer having a dry thickness of 0.2 μm to prepare a cured product.

On the other hand, when i-3 was used as an undercoating composition, 10 parts of a solution of ethylacetoacetate-aluminum-di-i-propylate in toluene (solid concentration: 15%) was added, followed by sufficient stirring was added to 100 parts of the undercoating composition, followed by sufficient stirring. The resultant composition was applied and dried so as to give a dry thickness of 2 μm. Then, a composition obtained by adding 3 parts of a solution of a reaction product of dibutyl tin diacetate and silicate oligomer in i-propyl alcohol (solid concentration: 15%) to 100 parts of the coating composition of the present invention and sufficiently stirring the resultant mixture was applied thereon and dried so as to give a coating layer having a dry thickness of 0.2 μm to prepare a cured product.

Adhesion and resistance to weather were evaluated for the resultant cured products. Results thereof are shown together in Tables 4 to 6. In examples in which two kinds of undercoating compositions were used, the compositions were provided an the substrate as a plurality of undercoat layers without mixing them, thereby specifying the total thickness.

TABLE 4

| Example | Substrate | Undercoating Composition | Photocatalyst-Containing Composition of the Invention | Adhesion | Resistance to Weather |
|---|---|---|---|---|---|
| 13 | PET Film | i-3 | I-1 | 100 | Good |
| 14 | (thickness: | i-3 | I-2 | 100 | Good |
| 15 | 50 μm, surface- | i-3 | I-3 | 100 | Good |
| 16 | treated with | i-3 | I-4 | 100 | Good |
| 17 | modified acrylic | i-3 | I-5 | 100 | Good |
| 18 | resin) | i-3 | I-6 | 100 | Good |
| 19 |  | i-4 | I-1 | 100 | Good |
| 20 |  | i-6 | I-1 | 100 | Good |

TABLE 4-continued

| Example | Substrate | Undercoating Composition | Photocatalyst-Containing Composition of the Invention | Adhesion | Resistance to Weather |
|---|---|---|---|---|---|
| 21 |  | i-6 | I-2 | 100 | Good |
| 22 |  | i-6 | I-3 | 100 | Good |
| 23 |  | i-6 | I-4 | 100 | Good |
| 24 |  | i-6 | I-5 | 100 | Good |
| 25 |  | i-6 | I-6 | 100 | Good |
| 26 | PMMA Plate | i-1 | I-2 | 100 | Good |
| 27 | (thickness: 2 mm) | i-2 | I-2 | 100 | Good |
| 28 |  | i-3 | I-2 | 100 | Good |
| 29 |  | i-4 | I-2 | 100 | Good |
| 30 |  | i-5 | I-2 | 100 | Good |
| 31 |  | i-6 | I-2 | 100 | Good |

TABLE 5

| Example | Substrate | Under coating Composition | Photocatalyst-Containing Composition of the Invention | Adhesion | Resistance to Weather |
|---|---|---|---|---|---|
| 32 | Acrylic Resin | i-5 | I-1 | 100 | Good |
| 33 | Film (thickness: | i-5 | I-2 | 100 | Good |
| 34 | 50 μm) | i-6 | I-1 | 100 | Good |
| 35 |  | i-6 | I-2 | 100 | Good |
| 36 | PC Plate | i-3 | I-1 | 100 | Good |
| 37 | (thickness: | i-3 | I-2 | 100 | Good |
| 38 | 2 mm) | i-6 | I-3 | 100 | Good |
| 39 |  | i-6 | I-4 | 100 | Good |
| 40 |  | i-6 | I-5 | 100 | Good |
| 41 | ABS Plate | i-1 | I-2 | 100 | Good |
| 42 | Inorganic Ceramic Substrate (12 mm) | Epoxy resin (0.5 μm) /i-1 | I-2 | 100 | Good |
| 43 | Foamed Concrete (ALC) | Epoxy resin (0.5 μm) /i-1 | I-2 | 100 | Good |
| 44 | Tile | i-1 | I-2 | 100 | Good |

TABLE 6

| Example | Substrate | Undercoating Composition | Photocatalyst-Containing Composition of the Invention | Adhesion | Resistance to Weather |
|---|---|---|---|---|---|
| 45 | Glass | i-5 | I-2 | 100 | Good |
| 46 | wood | Polyester emulsion (0.5 μm) /i-5 | I-2 | 100 | Good |

EXAMPLE 47

In a reaction vessel equipped with a stirrer and a reflux condenser, 151 parts of anatase type titanium oxide dispersed in water having a solid concentration of 24.5%, a pH of 3 and an average particle size of 50 nm as component (c) and 19 parts of methyltrimethoxysilane as component (a) were placed, followed by stirring at 30° C. for 1 hour. Then, 2 parts of methyltrimethoxysilane as component (a), 16 parts of an end alkoxysilyl group/poly(oxyethylene/ oxypropylene) group-containing oligomer (Mw: 10,000) as component (b) and 4 parts of i-propyl alcohol having a surface tension at 20° C. of 217 μN/cm) as component (d-1) were added and mixed, followed by stirring at 30° C. for 1 hour. Then, 22 parts of methyltrimethoxysilane as component (a), 40 parts of (E-1) as component (e) and 36 parts of i-propyl alcohol as component (d-1) were added and mixed, followed by stirring at 30° C. for 1 hour. Thereafter, 2 parts of ethylacetoacetate-aluminum-di-i-propylate as component (g) dissolved in 10 parts of i-propyl alcohol was added and mixed, followed by co-condensation reaction at 60° C. for 4 hours with stirring.

Then, 2 parts of acetylacetone was added as component (h), and stirred for 1 hour, followed by cooling to room temperature. Then, 600 parts of i-propyl alcohol was added as component (d-1) to obtain composition I-7 having a solid concentration of about 10%. Components of the composition prepared are shown in Table 7.

EXAMPLES 48 to 52

Compositions I-8 to I-12 were prepared in the same manner as with Example 47 with the exception that respective components shown in Table 7 were used. When colloidal silica dispersed in methanol (solid concentration: 10%), component (f), was added as an additional component, it was added after cooling to room temperature and addition of the diluting solvent. Components of the compositions are shown in Table 7.

Of the organic solvents shown in Table 7, ethylene glycol monobutyl ether has a surface tension (20° C.) of 274 μN/cm, and diethylene glycol monoethyl ether has a surface tension (20° C.) of 316 μN/cm.

TABLE 7

|  | Example | | | | | |
|---|---|---|---|---|---|---|
|  | 47 | 48 | 49 | 50 | 51 | 52 |
| Name of Composition | I-7 | I-8 | I-9 | I-10 | I-11 | I-12 |
| Mixing Component (parts) | | | | | | |
| In Mixing at Room Temp. (1) | | | | | | |
| Component (a): Methyl-trimethoxysilane | 19 | 19 | 19 | 13 | 13 | 18 |
| Component (c): Aqueous Dispersion of TiO$_2$ (solid conc.: 24.5%) | 151 | 151 | 151 | 105 | 105 | 147 |
| In Mixing at Room Temp. (2) | | | | | | |
| Component (a): Methyltrimethoxysilane | 2 | 2 | 2 | 15 | 15 | 22 |
| Component (b): | | | | | | |
| End alkoxysilyl group-containing trifunctional siloxane oligomer (Mw = 1000) | 0 | 16 | 0 | 0 | 0 | 0 |
| End alkoxysilyl group/poly(oxyethylene/oxypropylene) group-containing dimethylsiloxane oligomer (Mw 10,000) | 16 | 0 | 10 | 19 | 19 | 16 |
| Component (d-1): i-Propyl Alcohol | 4 | 4 | 4 | 26 | 26 | 15 |
| In Mixing at Room Temp. (3) | | | | | | |
| Component (a): | | | | | | |
| Methyltrimethoxysilane | 22 | 22 | 22 | 24 | 24 | 20 |
| Dimethyldimethoxysilane | 0 | 0 | 10 | 0 | 0 | 0 |
| Component (e): E-1 | 40 | 0 | 40 | 48 | 48 | 20 |

TABLE 7-continued

|  | Example | | | | | |
|---|---|---|---|---|---|---|
|  | 47 | 48 | 49 | 50 | 51 | 52 |
| E-2 | 0 | 40 | 0 | 0 | 0 | 0 |
| E-3 | 0 | 0 | 0 | 0 | 0 | 0 |
| Component (d-1): i-Propyl Alcohol | 36 | 36 | 32 | 40 | 40 | 32 |
| In Condensation Reaction | | | | | | |
| Component (g): Ethylacetoacetate-aluminum-di-i-propylate | 2 | 2 | 2 | 3 | 3 | 3 |
| Component (d-1): i-Propyl Alcohol | 10 | 10 | 10 | 13 | 13 | 15 |
| After-Addition Component | | | | | | |
| Component (h): Acetylacetone | 2 | 0 | 2 | 0 | 0 | 2 |
| Component (d-1): i-Propyl Alcohol | 600 | 550 | 600 | 550 | 600 | 600 |
| Component (d-2): | | | | | | |
| Ethylene Glycol Monobutyl Ether | 0 | 0 | 0 | 50 | 0 | 0 |
| Diethylene Glycol Monoethyl Ether | 0 | 50 | 0 | 0 | 0 | 0 |
| Additional Component Component (f): Colloidal Silica (dispersion in methanol 10%) | 0 | 0 | 0 | 0 | 200 | 0 |

EXAMPLES 53 to 58

To 100 parts of each coating composition of the present invention, 3 parts of a solution of a reaction product of dibutyl tin diacetate and silicate oligomer in i-propyl alcohol (solid concentration: 15%) was added and sufficiently stirred. The resultant composition was applied onto quartz glass and dried so as to give a dry thickness of 0.2 μm to obtain a cured product. For each cured product thus obtained, various evaluations were carried out. Results thereof are shown in Table 8.

TABLE 8

|  | Example | | | | | |
|---|---|---|---|---|---|---|
|  | 53 | 54 | 55 | 56 | 57 | 58 |
| Composition of the Invention | I-7 | I-8 | I-9 | I-10 | I-11 | I-12 |
| Storage Stability (solid conc. 10%) | ○ | ○ | ○ | ○ | ○ | ○ |
| Pencil Hardness | 4 H | 4 H | 4 H | 4 H | 4 H | 4 H |
| Resistance to Alkalis | Good | Good | Good | Good | Good | Good |
| Resistance to Organic Chemicals | Good | Good | Good | Good | Good | Good |
| Resistance to Moisture | Good | Good | Good | Good | Good | Good |
| Resistance to Weather | Good | Good | Good | Good | Good | Good |
| Resistance to Water | Good | Good | Good | Good | Good | Good |
| Resistance to Stains | ⊚ | ⊚ | ⊚ | ⊚ | ⊚ | ⊚ |
| Transparency | ○ | ○ | ○ | ○ | ○ | ○ |
| Hydrophilicyty (degree) | 4 | 3 | 2 | 3 | 2 | 3 |

EXAMPLES 59 to 92

To 100 parts of each of undercoating compositions (i-1), (i-2) and (i-4) to (i-6), 10 parts of a solution of dioctyl tin dimaleate ester in i-propyl alcohol (solid concentration: 15%) was added, followed by sufficient stirring. The resultant composition was applied onto each substrate shown in Tables 9 to 11, and dried so as to give a dry thickness of 2 μm. Then, a composition obtained by adding 3 parts of a solution of a reaction product of dibutyl tin diacetate and silicate oligomer in i-propyl alcohol (solid concentration: 15%) to 100 parts of each of the coating compositions of the present invention and sufficiently stirring the resultant mixture was applied thereon and dried so as to give a coating layer having a dry thickness of 0.2 μm to prepare a cured product.

On the other hand, when i-3 was used as an undercoating composition, 10 parts of a solution of ethylacetoacetate-aluminum-di-i-propylate in toluene (solid concentration: 15%) was added, followed by sufficient stirring was added to 100 parts of the undercoating composition, followed by sufficient stirring. The resultant composition was applied and dried so as to give a dry thickness of 2 μm. Then, a composition obtained by adding 3 parts of a solution of a reaction product of dibutyl tin diacetate and silicate oligomer in i-propyl alcohol (solid concentration: 15%) to 100 parts of the coating composition of the present invention and sufficiently stirring the resultant mixture was applied thereon and dried so as to give a coating layer having a dry thickness of 0.2 μm to prepare a cured product.

Adhesion and resistance to weather were evaluated for the resultant cured products. Results thereof are shown together in Tables 9 to 11. In examples in which two kinds of undercoating compositions were used, the compositions were provided on the substrate as a plurality of undercoat layers without mixing them, thereby specifying the total thickness.

TABLE 9

| Example | Substrate | Undercoating Composition | Photocatalyst-Containing Composition of the Invention | Adhesion | Resistance to Weather |
|---|---|---|---|---|---|
| 59 | PET Film | i-3 | I-7 | 100 | Good |
| 60 | (thickness: | i-3 | I-8 | 100 | Good |
| 61 | 50 μm) | i-3 | I-9 | 100 | Good |
| 62 | (surface-treated | i-3 | I-10 | 100 | Good |
| 63 | with modified | i-3 | I-11 | 100 | Good |
| 64 | acrylic resin) | i-3 | I-12 | 100 | Good |
| 65 |  | i-5 | I-7 | 100 | Good |
| 66 |  | i-6 | I-7 | 100 | Good |
| 67 |  | i-6 | I-8 | 100 | Good |
| 68 |  | i-6 | I-9 | 100 | Good |
| 69 |  | i-6 | I-10 | 100 | Good |
| 70 |  | i-6 | I-11 | 100 | Good |
| 71 |  | i-6 | I-12 | 100 | Good |
| 72 | PMMA Plate | i-1 | I-7 | 100 | Good |
| 73 | (thickness: 2 mm) | i-2 | I-7 | 100 | Good |
| 74 |  | i-3 | I-7 | 100 | Good |
| 75 |  | i-4 | I-7 | 100 | Good |
| 76 |  | i-5 | I-7 | 100 | Good |
| 77 |  | i-6 | I-7 | 100 | Good |

TABLE 10

| Example | Substrate | Undercoating Composition | Photocatalyst-Containing Composition of the Invention | Adhesion | Resistance to Weather |
|---|---|---|---|---|---|
| 78 | Acrylic Resin | i-5 | I-7 | 100 | Good |
| 79 | Film | i-5 | I-12 | 100 | Good |
| 80 | (thickness: | i-6 | I-7 | 100 | Good |
| 81 | 50 μm) | i-6 | I-12 | 100 | Good |
| 82 | PC Plate | i-3 | I-7 | 100 | Good |
| 83 | (thickness: | i-3 | I-8 | 100 | Good |
| 84 | 2 mm) | i-6 | I-9 | 100 | Good |
| 85 |  | i-6 | I-10 | 100 | Good |
| 86 |  | i-6 | I-11 | 100 | Good |
| 87 | ABS Plate | i-1 | I-7 | 100 | Good |
| 88 | Inorganic Ceramic Substrate (12 mm) | Epoxy resin (0.5 μm)/i-1 | I-7 | 100 | Good |
| 89 | Foamed Concrete (ALC) | Epoxy resin (0.5 μm)/i-1 | I-12 | 100 | Good |

TABLE 11

| Example | Substrate | Undercoating Composition | Photocatalyst-Containing Composition of the Invention | Adhesion | Resistance to Weather |
|---|---|---|---|---|---|
| 90 | Tile | i-1 | I-12 | 100 | Good |
| 91 | Glass | i-5 | I-7 | 100 | Good |
| 92 | Wood | Polyester emulsion (0.5 μm)/i-5 | I-7 | 100 | Good |

Reference Example 4
Synthesis of Component (e)

In a reaction vessel equipped with a stirrer and a reflux condenser, 55 parts of methyl methacrylate, 5 parts of 2-ethylhexyl acrylate, 5 parts of cyclohexyl methacrylate, 10 parts of γ-methacryloxypropyltrimethoxysilane, 20 parts of glycidyl methacrylate, 5 parts of 4-(meth)acryloyloxy-2,2,6,6-tetramethylpiperidine, 75 parts of i-butyl alcohol, 50 parts of methyl ethyl ketone and 25 parts of methanol were placed and mixed. Then, the mixture was heated to 80° C. with stirring, and a solution of 3 parts of azobisisovaleronitrile in 8 parts of xylene was added dropwise to the mixture for 30 minutes, followed by reaction at 80° C. for 5 hours. Thereafter, 36 parts of methyl ethyl ketone was added thereto and stirred to obtain a polymer solution having a solid concentration of about 35% (hereinafter referred to as "(E-4)"), the polymer having an Mw of 12,000.

Reference Example 5
Synthesis of Component (e)

In a reaction vessel equipped with a stirrer and a reflux condenser, 55 parts of methyl methacrylate, 5 parts of 2-ethylhexyl acrylate, 5 parts of cyclohexyl methacrylate, 10 parts of γ-methacryloxypropyltrimethoxysilane, 20 parts of 2-hydroxyethyl methacrylate, 5 parts of 4-(meth) acryloyloxy-2,2,6,6-tetramethylpiperidine, 75 parts of i-butyl alcohol, 50 parts of methyl ethyl ketone and 25 parts of methanol were placed and mixed. Then, the mixture was heated to 80° C. with stirring, and a solution of 3 parts of azobisisovaleronitrile in 8 parts of xylene was added dropwise to the mixture for 30 minutes, followed by reaction at 80° C. for 5 hours. Thereafter, 36 parts of methyl ethyl ketone was added thereto and stirred to obtain a polymer solution having a solid concentration of about 35% (hereinafter referred to as "(E-5)") was obtained, the polymer having an Mw of 13,000.

EXAMPLE 93

In a reaction vessel equipped with a stirrer and a reflux condenser, 157 parts of anatase type titanium oxide dispersed in water having a solid concentration of 24.5%, a pH of 3 and an average particle size of 50 nm as component (c), 8 parts of 3-glycidoxypropyltrimethoxysilane as component (a-1) and 11 parts of an end alkoxysilyl group/poly(oxyethylene/oxypropylene) group-containing oligomer (MAC2101 manufactured by Nippon Unicar Company Limited.) as component (b) were placed and mixed, followed by stirring at 30° C. for 10 minutes. Then, 22 parts of i-propyl alcohol having a surface tension at 20° C. of 217 $\mu$N/cm) as component (d-1) was added and mixed, followed by stirring at 30° C. for 1 hour. Then, 60 parts of methyltrimethoxysilane as component (a-2) and 23 parts of (E-4) as component (e) were added and mixed, followed by stirring at 30° C. for 1 hour. Thereafter, 3 parts of ethylacetoacetate-aluminum-di-i-propylate as component (g) dissolved in 17 parts of i-propyl alcohol was added and mixed, followed by co-condensation reaction at 60° C. for 4 hours with stirring.

Then, the reaction product was cooled to room temperature to obtain a composition of the present invention having a solid concentration of about 30%. Thereafter, 600 parts of i-propyl alcohol was added as diluting solvent (d-1) to obtain composition I-13 of the present invention having a solid concentration of about 10%. Components of the composition prepared are shown in Table 12.

EXAMPLES 94 to 98

Compositions I-14 to I-18 were prepared in the same manner as with Example 93 with the exception that respective components shown in Table 12 were used. When colloidal silica dispersed in methanol (solid concentration: 10%), component (f), was added as an additional component, it was added after cooling to room temperature and addition of the diluting solvent. Components of the compositions are shown in Table 12.

Comparative Example 1
Overcoating Composition Using No Composition (a-1)

In a reaction vessel equipped with a stirrer and a reflux condenser, 117 parts of anatase type titanium oxide dispersed in water having a solid concentration of 24.5%, a pH of 3 and an average particle size of 50 nm as component (c), 10 parts of methyltrimethoxysilane as component (a-2) and 20 parts of an end alkoxysilyl group/poly(oxyethylene/oxypropylene) group-containing oligomer (MAC2101 manufactured by Nippon Unicar Company Limited.) as component (b) were placed and mixed, followed by stirring at 30° C. for 10 minutes. Then, 45 parts of i-propyl alcohol having a surface tension at 20° C. of 217 $\mu$N/cm) as component (d-1) was added and mixed, followed by stirring at 30° C. for 1 hour, Then, 60 parts of methyltrimethoxysilane as component (a-2) and 27 parts of (E-4) as component (e) were added and mixed, followed by stirring at 30° C. for 1 hour. Thereafter, 3 parts of ethylacetoacetate-aluminum-di-i-propylate as component (g) dissolved in 17 parts of i-propyl alcohol was added and mixed, followed by co-condensation reaction at 60° C. for 4 hours with stirring.

Then, the reaction product was cooled to room temperature to obtain a composition having a solid concentration of about 30%. Thereafter, 600 parts of i-propyl alcohol was added as diluting solvent (d-1) to obtain composition I-19 having a solid concentration of about 10%.

Of the organic solvents shown in Table 12, ethylene glycol monobutyl ether has a surface tension (20° C.) of 274 $\mu$N/cm.

TABLE 12

| Example<br>Name of Composition | 93<br>I-13 | 94<br>I-14 | 95<br>I-15 | 96<br>I-16 | 97<br>I-17 | 98<br>I-18 |
|---|---|---|---|---|---|---|
| Mixing Component (parts) | | | | | | |
| In Mixing at Room Temp. (1) | | | | | | |
| Component (a): 3-Glycidoxy-propyltrimethoxysilane | 8 | 9 | 9 | 9 | 7 | 9 |
| Component (b): End alkoxy-silyl group/poly(oxyethylene/oxypropylene) group-containing dimethylsiloxane oligomer (Mw 10,000) | 11 | 13 | 13 | 13 | 11 | 13 |
| Component (c): Aqueous Dispersion of TiO$_2$ (solid conc.: 24.5%) | 157 | 117 | 117 | 117 | 117 | 117 |
| Component (d-1): i-Propyl Alcohol | 22 | 41 | 41 | 41 | 30 | 41 |
| In Mixing at Room Temp. (2) | | | | | | |
| Component (a-2): | | | | | | |
| Methyltrimethoxysilane | 60 | 70 | 61 | 70 | 58 | 70 |
| Dimethyldimethoxysilane | 0 | 0 | 10 | 0 | 0 | 0 |
| Component (e): | | | | | | |
| E-4 | 23 | 27 | 0 | 0 | 54 | 27 |
| E-5 | 0 | 0 | 27 | 27 | 0 | 0 |
| E-3 | 0 | 0 | 0 | 0 | 0 | 0 |
| In Condensation Reaction | | | | | | |
| Component (g): Ethylacetoacetate-aluminum-di-i-propylate | 3 | 4 | 4 | 4 | 4 | 4 |
| Component (d-1): i-Propyl Alcohol | 17 | 19 | 19 | 19 | 19 | 19 |
| After-Addition Component | | | | | | |
| Component (h): Acetylacetone Organic Solvent for After Dilution | 0 | 0 | 0 | 3 | 0 | 0 |
| Component (d-1): i-Propyl Alcohol | 600 | 600 | 600 | 600 | 600 | 550 |
| Component (d-2): Ethylene Glycol Monobutyl Ether | 0 | 0 | 0 | 0 | 0 | 50 |
| Additional Component | | | | | | |
| Component (f): Colloidal Silica (dispersion in methanol 10%) | 0 | 0 | 0 | 0 | 0 | 200 |

Preparation Example 7
Preparation of Undercoating Composition

In a reaction vessel equipped with a stirrer and a reflux condenser, 24 parts of methyltrimethoxysilane and 10 parts of dimethyldimethoxysilane as component (a), 118 parts of (E-4) having a solid concentration of 35% as component (e), 2 parts of ethylacetoacetate-aluminum-di-i-propylate as component (g) and 10 parts of ispropyl alcohol were placed and mixed. The temperature of the mixture was elevated to 50° C. with stirring.

Further, 6 parts of water was continuously added for 30 minutes, followed by reaction at 60° C. for 4 hours. Then, 2 parts of acetylacetone was added as component (h), and stirred for 1 hours followed by cooling to room temperature. Thereafter, 429 parts of methyl ethyl ketone was added as an after-diluent, component (e) with stirring to obtain undercoating composition (i-7) Respective components of the composition thus prepared are shown in Table 13.

Preparation Examples 8 to 12

Preparation of Undercoating Compositions

Undercoating compositions (i-8) to (i-12) were obtained in the same manner as with Preparation Example 7 with the exception that respective components shown in Table 13 were used. When colloidal silica dispersed in isopropyl alcohol (solid concentration: 10%) or $CeO_2$ dispersed in methyl isobutyl ketone (solid concentration: 10%) was added as an after-addition component, it was added after cooling to room temperature and addition of the after-diluent, component (e), so as to give a solid concentration of about 10% (after adjustment of the solid concentration to 10%).

TABLE 13

| Preparation Example | 7 | 8 | 9 | 10 | 11 | 12 |
|---|---|---|---|---|---|---|
| Name of Composition | i-7 | i-8 | i-9 | i-10 | i-11 | i-12 |
| Mixing Component (parts) | | | | | | |
| Component (a): | | | | | | |
| Methyltrimethoxysilane | 24 | 24 | 24 | 50 | 50 | 24 |
| Dimethyldimethoxysilane | 10 | 10 | 10 | 17 | 17 | 10 |
| Component (e): | | | | | | |
| (E-4) | 118 | 118 | 118 | 100 | 0 | 0 |
| (E-5) | 0 | 0 | 0 | 0 | 100 | 0 |
| (E-3) | 0 | 0 | 0 | 0 | 0 | 138 |
| Component (d): | | | | | | |
| i-Propyl Alcohol | 10 | 10 | 10 | 14 | 14 | 0 |
| Ethylene Glycol Monobutyl Ether | 0 | 0 | 0 | 3 | 3 | 0 |
| Component (d) Added in Reaction: Water | 6 | 6 | 6 | 12 | 12 | 6 |
| Component (d) Added after Completion of Reaction and Cooling: | | | | | | |
| Methyl Isobutyl Ketone | 429 | 429 | 429 | 0 | 0 | 409 |
| Methyl Ethyl Ketone | 0 | 0 | 0 | 300 | 300 | 0 |
| Butyl Acetate | 0 | 0 | 0 | 100 | 100 | 0 |
| i-Propyl Alcohol | 0 | 0 | 0 | 100 | 100 | 0 |
| Component (g): Ethylaceto-acetate-aluminum-di-i-propylate | 2 | 2 | 2 | 2 | 2 | 2 |
| After-Addition Component (parts) | | | | | | |
| Component (h): Acetylacetone | 2 | 2 | 2 | 2 | 2 | 2 |
| Additional Component | | | | | | |
| Component (f): Colloidal Silica dispersed in i-Propyl Alcohol (solid conc.: 10%) | 0 | 0 | 300 | 300 | 0 | 300 |
| Component (j): $CeO_2$ Dispersed in Methyl Isobutyl Ketone (solid conc.: 10%) | 0 | 100 | 100 | 0 | 0 | 0 |

EXAMPLES 99 to 110

The storage stability of the compositions of the present invention having a solid concentration of 30% or 10% was evaluated.

To 100 parts of each coating composition of the present invention, 3 parts of a solution of a reaction product of dibutyl tin diacetate and silicate oligomer in i-propyl alcohol (solid concentration: 15%) was added and sufficiently stirred, The resultant composition was applied onto quartz glass and dried so as to give a dry thickness of 0.2 μm to obtain a cured product. For each cured product thus obtained, various evaluations were carried out. Results thereof are shown in Table 14.

Comparative Example 2

The storage stability of composition I-19 having a solid concentration of 30% or 10% was evaluated.

On the other hand, to 100 parts of overcoating composition I-19, 3 parts of a solution of a reaction product of dibutyl tin diacetate and silicate oligomer in i-propyl alcohol (solid concentration: 15%) was added and sufficiently stirred. The resultant composition was applied onto quartz glass and dried so as to give a dry thickness of 0.2 μm to obtain a cured product. For the cured product thus obtained, various evaluations were carried out. Results thereof are shown in Table 14.

TABLE 14

| | Example | | | | | | Comparative Example 2 |
|---|---|---|---|---|---|---|---|
| Composition of the Invention | 99 I-13 | 100 I-14 | 101 I-15 | 102 I-16 | 103 I-17 | 104 I-18 | I-19 |
| Storage Stability | | | | | | | |
| (solid conc. 30%) | ◯ | ◯ | ◯ | ◯ | ◯ | ◯ | X |
| (solid conc. 10%) | ◯ | ◯ | ◯ | ◯ | ◯ | ◯ | ◯ |
| Pencil Hardness | 4H | 4H | 4H | 4H | 4H | 4H | 4H |
| Resistance to Alkalis | Good | Good | Good | Good | Good | Good | Good |
| Resistance to Organic Chemicals | Good | Good | Good | Good | Good | Good | Good |
| Resistance to Moisture | Good | Good | Good | Good | Good | Good | Good |
| Resistance to Weather | Good | Good | Good | Good | Good | Good | Good |
| Resistance to Water | Good | Good | Good | Good | Good | Good | Good |
| Resistance to Stains | ⊚ | ⊚ | ⊚ | ⊚ | ⊚ | ⊚ | ⊚ |
| Transparency | ◯ | ◯ | ◯ | ◯ | ◯ | ◯ | ◯ |
| Hydrophilicity (degree) | 4 | 3 | 2 | 3 | 2 | 3 | 4 |

EXAMPLES 105 to 138

To 100 parts of each of undercoating compositions (i-7) to (i-12), 10 parts of a solution of dioctyl tin dimaleate ester in i-propyl alcohol (solid concentration: 15%) was added, followed by sufficient stirring. The resultant composition was applied onto each substrate shown in Tables 15 to 17, and dried so as to give a dry thickness of 2 μm. Then, a composition obtained by adding 3 parts of a solution of a reaction product of dibutyl tin diacetate and silicate oligomer in i-propyl alcohol (solid concentration: 15%) to 100 parts of each of the overcoating compositions of the present invention and sufficiently stirring the resultant mixture was applied thereon dried so as to give a coating layer having a dry thickness of 0.2 μm to prepare a cured product.

Adhesion and resistance to weather were evaluated for the resultant cured products. Results thereof are shown together in Tables 15 to 17. In examples in which two kinds of undercoating compositions were used, the compositions were provided on the substrate as a plurality of undercoat layers without mixing them, thereby specifying the total thickness.

TABLE 15

| Example | Substrate | Undercoating Composition | Photocatalyst-Containing Composition of the Invention | Adhesion | Resistance to Weather |
|---|---|---|---|---|---|
| 105 | PET Film | i-9 | I-13 | 100 | Good |
| 106 | (thickness: | i-9 | I-14 | 100 | Good |
| 107 | 50 μm) (surface- | i-7 | I-15 | 100 | Good |
| 108 | treated with | i-8 | I-16 | 100 | Good |
| 109 | modified acrylic | i-11 | I-17 | 100 | Good |
| 110 | resin) | i-12 | I-18 | 100 | Good |
| 111 | | i-10 | I-13 | 100 | Good |
| 112 | | i-10 | I-14 | 100 | Good |
| 113 | | i-10 | I-15 | 100 | Good |
| 114 | | i-10 | I-16 | 100 | Good |
| 115 | | i-10 | I-17 | 100 | Good |
| 116 | | i-10 | I-18 | 100 | Good |
| 117 | | i-12 | I-14 | 100 | Good |
| 118 | PMMA Plate | i-7 | I-13 | 100 | Good |
| 119 | (thickness: 2 mm) | i-8 | I-13 | 100 | Good |
| 120 | | i-9 | I-13 | 100 | Good |
| 121 | | i-8 | I-14 | 100 | Good |
| 122 | | i-9 | I-14 | 100 | Good |
| 123 | | i-12 | I-14 | 100 | Good |

TABLE 16

| Example | Substrate | Undercoating Composition | Photocatalyst Containing Composition of the Invention | Adhesion | Resistance to Weather |
|---|---|---|---|---|---|
| 124 | Acrylic Resin | i-9 | I-13 | 100 | Good |
| 125 | Film | i-9 | I-14 | 100 | Good |
| 126 | (thickness: | i-12 | I-13 | 100 | Good |
| 127 | 50 μm) | i-12 | I-14 | 100 | Good |
| 128 | PC Plate | i-9 | I-13 | 100 | Good |
| 129 | (thickness: | i-9 | I-14 | 100 | Good |
| 130 | 2 mm) | i-12 | I-15 | 100 | Good |
| 131 | | i-12 | I-16 | 100 | Good |
| 132 | | i-12 | I-17 | 100 | Good |
| 133 | ABS Plate | i-10 | I-13 | 100 | Good |
| 134 | Inorganic Ceramic Substrate (12 mm) | Epoxy resin (0.5 μm)/i-11 | I-13 | 100 | Good |
| 135 | Foamed Concrete (ALC) | Epoxy resin (0.5 μm)/i-11 | I-18 | 100 | Good |

TABLE 17

| Example | Substrate | Undercoating Composition | Photocatalyst Containing Composition of the Invention | Adhesion | Resistance to Weather |
|---|---|---|---|---|---|
| 136 | Tile | i-10 | I-14 | 100 | Good |
| 137 | Glass | i-10 | I-13 | 100 | Good |
| 138 | Wood | Polyester emulsion (0.5 μm)/i-11 | I-13 | 100 | Good |

What is claimed is:

1. A coating composition comprising:
   (a-1) at least one component selected from the group consisting of an organosilane represented by general formula (1) wherein n is 1 or 2, and at least one of $R^1$ groups is an epoxy group-containing substituted derivative, a hydrolyzate of said organosilane and a condensate of said organosilane; and
   (a-2) at least one component selected from the group consisting of an organosilane represented by general formula (1) wherein no epoxy group is contained in $R^1$, a hydrolyzate of said organosilane and a condensate of said organosilane;
   (b) an organosiloxane oligomer having a weight average molecular weight of 300 to 100,000;
   (c) a photocatalyst; and
   (d') an organic solvent having a surface tension at 20° C. of 260 μN/cm or less:

$$(R^1)_n Si(OR^2)_{4-n} \quad (1)$$

wherein, $R^1$, which may be the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2.

2. A coating composition comprising:
   (a) at least one component selected from the group consisting of an organosilane represented by the following general formula (1), a hydrolyzate of said organosilane and a condensates of said organosilane;
   (b) an organosiloxane oligomer having a weight average molecular weight of 300 to 100,000;
   (c) a photocatalyst;
   (d') an organic solvent having a surface tension at 20° C. of 260 μN/cm or less:

$$(R^1)_n Si(OR^2)_{4-n} \quad (1)$$

wherein, $R^1$, which may be the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2; and
   (e) a polymer containing a silyl group having a silicon atom bound to a hydrolytic group and/or a hydroxyl group.

3. The coating composition according to claim 1, wherein said component (b) has a group represented by general formula —(RO) p—(R'O)q—R" wherein R and $R^1$, which may be the same or different, represent alkyl groups each having 1 to 5 carbon atoms, R" represents a hydrogen atom or an alkyl group having 1 to 5 carbon atoms, and p+q is from 2 to 30, and a silyl group having a silicon atom bound to a hydrolytic group and/or a hydroxyl group.

4. A method for producing a coating composition which comprises hydrolyzing and/or condensing:
   (a-1) at least one component selected from the group consisting of an organosilane represented by general formula (1) wherein n is 1 or 2, and at least one of $R^1$ groups is an epoxy group-containing substituted derivative, a hydrolyzate of said organosilane and a condensate of said organosilane; and
   (a-2) at least one component selected from the group consisting of an organosilane represented by general formula (1) wherein no epoxy group is contained in $R^1$, a hydrolyzate of said organosilane and a condensate of said organosilane; and (b) an organosiloxane oligomer having a weight average molecular weight of 300 to 100,000;

in the presence of (c') an aqueous dispersion of a photocatalyst having a pH of 3 to 9 and (d') an organic solvent in which the content of an organic solvent having a surface tension at 20° C. of more than 260 µN/cm is 20% by weight or less based on the whole organic solvent:

$$(R^1)_n Si(OR^2)_{4-n} \quad (1)$$

wherein, $R^1$, which maybe the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2.

5. A cured product obtained by coating and drying a coating composition comprising:
   (a-1) at least one component selected from the group consisting of an organosilane represented by general formula (1) wherein n is 1 or 2, and at least one of $R^1$ groups is an epoxy group-containing substituted derivative, a hydrolyzate of said organosilane and a condensate of said organosilane; and
   (a-2) at least one component selected from the group consisting of an organosilane represented by general formula (1) wherein no epoxy group is contained in $R^1$, a hydrolyzate of said organosilane and a condensate of said organosilane;
   (b) an organosiloxane oligomer having a weight average molecular weight of 300 to 100,000;
   (c) a photocatalyst; and
   (d') an organic solvent having a surface tension at 20° C. of 260 µN/cm or less:

$$(R^1)_n Si(OR^2)_{4-n} \quad (1)$$

wherein, $R^1$, which may be the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2.

6. A cured product having a dry coating layer comprising any one of the following undercoating compositions (i) to (iv), and having thereon a dry coating layer comprising the coating composition according to claim 1:
   (i) An undercoating composition containing said components (a-1), (a-2), and (e), wherein (e) is a polymer containing a silyl group having a silicon atom bound to a hydrolytic group and/or a hydroxyl group:
   (ii) An undercoating composition containing said components (a-1), (a-2), (e), and (f), wherein (f) is colloidal silica and/or colloidal alumina;
   (iii) An undercoating composition containing said components (a-1), (a-2), (e), and (g), wherein (g) is colloidal cerium oxide and/or colloidal zinc oxide; and
   (iv) An undercoating composition containing said components (a-1), (a-2), (e), (f) and (g).

7. The coating composition according to claim 2, wherein said component (a) is
   (a-1) at least one component selected from the group consisting of an organosilane represented by general formula (1) wherein n is 1 or 2, and at least one of $R^1$ groups is an epoxy group-containing substituted derivative, a hydrolyzate of said organosilane and a condensate of said organosilane; and
   (a-2) at least one component selected from the group consisting of an organosilane represented by general formula (1) wherein no epoxy group is contained in $R^1$, a hydrolyzate of said organosilane and a condensate of said organosilane.

8. The coating composition according to claim 2, wherein said component (b) has a group represented by general formula —(RO)p—(R'O)q—R" wherein R and R', which may be the same or different, represent alkyl groups each having 1 to 5 carbon atoms, R" represents a hydrogen atom or an alkyl group having 1 to 5 carbon atoms, and p+q is from 2 to 30, and a silyl group having a silicon atom bound to a hydrolytic group and/or a hydroxyl group.

9. The coating composition according to claim 1, wherein said component (a-1) is γ-glycidoxypropyltrimethoxysilane.

10. The coating composition according to claim 1, wherein said component (b) is a mixture of an oligomer having a weight average molecular weight ranging from 400 to 2,800 and an oligomer having a weight average molecular weight ranging from 3,000 to 50,000.

11. The coating composition according to claim 1, wherein said component (d') is isopropyl alcohol.

12. The method according to claim 4, wherein said component (a-1) is γ-glycidoxypropyltrimethoxysilane.

13. The method according to claim 4, wherein said component (b) is a mixture of an oligomer having a weight average molecular weight ranging from 400 to 2,800 and an oligomer having a weight average molecular weight ranging from 3,000 to 50,000.

14. The method according to claim 4, wherein said component (d') is isopropyl alcohol.

15. A method for producing a coating composition which comprises hydrolyzing and/or condensing:
   (a) an organosilane represented by the following general formula (1); and
   (b) an organosiloxane oligomer having a weight average molecular weight of 300 to 100,000;
   in the presence of (c') an aqueous dispersion of a photocatalyst having a pH of 3 to 9 and (d') an organic solvent in which the content of an organic solvent having a surface tension at 20° C. of more than 260 µN/cm is 20% by weight or less based on the whole organic solvent:

$$(R^1)_n Si(OR^2)_{4-n} \quad (1)$$

wherein, $R^1$, which maybe the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2;

and subsequently adding (e) a polymer containing a silyl group having a silicon atom bound to a hydrolytic group and/or a hydroxyl group.

16. The method according to claim 15, wherein said component (a) is
   (a-1) at least one component selected from the group consisting of an organosilane represented by general formula (1) wherein n is 1 or 2, and at least one of $R^1$ groups is an epoxy group-containing substituted derivative, a hydrolyzate of said organosilane and a condensate of said organosilane; and (a-2) at least one component selected from the group consisting of an organosilane represented by general formula (1) wherein no epoxy group is contained in $R^1$, a hydrolyzate of said organosilane and a condensate of said organosilane.

17. The method according to claim 15, wherein said component (a) is selected from the group consisting of methyltrimethoxysilane, dimethyldimethoxysilane, and γ-glycidoxypropyltrimethoxysilane.

18. The method according to claim 15, wherein said component (b) is a mixture of an oligomer having a weight average molecular weight ranging from 400 to 2,800 and an oligomer having a weight average molecular weight ranging from 3,000 to 50,000.

19. The method according to claim 15, wherein said component (d') is isopropyl alcohol.

20. A cured product having a dry coating layer comprising any one of the following undercoating compositions (i) to (iv), and having thereon a dry coating layer comprising the coating composition according to claim 2:

(i) An undercoating composition containing said components (a) and (e), wherein (e) is a polymer containing a silyl group having a silicon atom bound to a hydrolytic group and/or a hydroxyl group:

(ii) An undercoating composition containing said components (a), (e), and (f), wherein (f) is colloidal silica and/or colloidal alumina;

(iii) An undercoating composition containing said components (a), (e), and (g), wherein (g) is colloidal cerium oxide and/or colloidal zinc oxide; and (iv) An undercoating composition containing said components (a), (e), (f) and (g).

21. The coating composition according to claim 2, wherein said component (b) is a mixture of an oligomer having a weight average molecular weight ranging from 400 to 2,800 and an oligomer having a weight average molecular weight ranging from 3,000 to 50,000.

22. The coating composition according to claim 2, wherein said component (d') is isopropyl alcohol.

23. A cured product obtained by coating and drying a coating composition comprising:

(a) at least one component selected from the group consisting of an organosilane represented by the following general formula (1), a hydrolyzate of said organosilane and a condensates of said organosilane;

(b) an organosiloxane oligomer having a weight average molecular weight of 300 to 100,000;

(c) a photocatalyst; and (d') an organic solvent having a surface tension at 20° C. of 260 μN/cm or less:

wherein, $R^1$, which may be the same or different when two or more $R^1$ groups are present, represents a monovalent organic group having 1 to 10 carbon atoms; $R^2$, which may be the same or different when two or more $R^2$ groups are present, represents an alkyl group having 1 to 5 carbon atoms or an acyl group having 1 to 6 carbon atoms; and n is an integer ranging from 0 to 2; and (e) a polymer containing a silyl group having a silicon atom bound to a hydrolytic group and/or a hydroxyl group.

24. A cured product having a dry coating layer comprising any one of the following undercoating compositions (i) to (iv), and having thereon a dry coating layer comprising the coating composition according to claim 7:

(i) An undercoating composition containing said components (a), and (e), wherein (e) is a polymer containing a silyl group having a silicon atom bound to a hydrolytic group and/or a hydroxyl group:

(ii) An undercoating composition containing said components (a), (e), and (f), wherein (f) is colloidal silica and/or colloidal alumina;

(iii) An undercoating composition containing said components (a), (e), and (g), wherein (g) is colloidal cerium oxide and/or colloidal zinc oxide; and (iv) An undercoating composition containing said components (a), (e), (f) and (g).

* * * * *